(12) United States Patent
Buck

(10) Patent No.: US 6,296,795 B1
(45) Date of Patent: Oct. 2, 2001

(54) NON-WOVEN FIBROUS BATTS, SHAPED ARTICLES, FIBER BINDERS AND RELATED PROCESSES

(76) Inventor: George S. Buck, 6707 Fletcher Creek Cove, Memphis, TN (US) 38113

(*) Notice: Subject to any disclaimer, the term of this patent is extended or adjusted under 35 U.S.C. 154(b) by 0 days.

(21) Appl. No.: 09/574,199

(22) Filed: May 19, 2000

(51) Int. Cl.[7] .................................................. B27N 5/00
(52) U.S. Cl. ........................ 264/122; 264/109; 264/119
(58) Field of Search .................................. 264/109, 119, 264/122; 156/62.2

(56) References Cited

U.S. PATENT DOCUMENTS

| | | | |
|---|---|---|---|
| T101,102 | 10/1981 | Turner | 8/495 |
| 3,723,223 | 3/1973 | LeCompte | 156/313 |
| 3,765,971 | 10/1973 | Fleissner | 156/62.2 |
| 3,943,981 | 3/1976 | Brabander | 13/391 |
| 3,993,518 | 11/1976 | Buck | 156/62.2 |
| 3,997,942 | 12/1976 | Buck | 19/155 |
| 4,012,549 | 3/1977 | Slysh | 428/116 |
| 4,014,726 | 3/1977 | Fargo | 156/167 |
| 4,047,991 | 9/1977 | Buck | 156/62.6 |
| 4,051,294 | 9/1977 | Buck | 428/283 |
| 4,053,673 | 10/1977 | Buck | 428/283 |
| 4,053,674 | 10/1977 | Buck | 428/283 |
| 4,139,698 | 2/1979 | Watts | 536/50 |
| 4,147,737 | 4/1979 | Sein | 260/835 |
| 4,197,349 | 4/1980 | Walser | 428/378 |
| 4,211,817 | 7/1980 | Buck | 428/310 |
| 4,212,704 | 7/1980 | Durand | 162/175 |
| 4,221,602 | 9/1980 | Walser | 106/211 |
| 4,233,046 | 11/1980 | Walser | 65/3 C |
| 4,363,680 | 12/1982 | Buck | 156/62.6 |
| 4,397,756 | 8/1983 | Lehmann | 252/182 |
| 4,457,793 | 7/1984 | Buck | 156/62.6 |
| 4,470,877 | 9/1984 | Johnstone | 162/124 |
| 4,473,428 | 9/1984 | Buck | 156/474 |
| 4,476,175 | 10/1984 | Forry et al. | 428/170 |
| 4,524,164 | 6/1985 | Viswanathan | 524/14 |
| 4,528,127 | 7/1985 | Holderegger | 525/530 |
| 4,548,676 | 10/1985 | Johnstone | 162/135 |
| 4,550,050 | 10/1985 | Buck | 428/283 |
| 4,585,685 | 4/1986 | Forry | 428/143 |
| 4,609,686 | 9/1986 | Giordzno | 522/31 |
| 4,714,096 | 12/1987 | Guay | 130/391 |
| 4,804,414 | 2/1989 | Gleason | 106/212 |
| 4,869,950 | 9/1989 | Elsen | 428/198 |

(List continued on next page.)

FOREIGN PATENT DOCUMENTS

WO 99/64656    12/1999   (WO).

Primary Examiner—Mary Lynn Theisen
(74) Attorney, Agent, or Firm—David R. Murphy

(57) ABSTRACT

A process for producing a shaped article from a bonded, non-woven, fibrous batt of fibers comprising a number of steps. There is first provided (A) a dry, solid, heat-responsive fiber-binder; and (B) a moisture-responsive fiber-binder which is a dry, solid, particulate, raw, ungelled starch which swells and becomes sticky upon contact with moisture. The heat-responsive fiber-binder is contacted with the fibers to form a raw batt with the heat-responsive fiber-binder loosely adhering to the fibers of the batt. The moisture-responsive fiber-binder is contacted with the fibers to form a raw batt with the moisture-responsive fiber-binder loosely adhering to the fibers of the batt. The batt is heated to a temperature above the binding temperature of the heat responsive fiber-binder but below the scorching or melting point of the fibers thereby activating the heat-responsive fiber-binder whereupon the heat-responsive fiber-binder engages the intersections of the fibers binding the fibers together at their intersections thereby converting the raw batt into a partially cured batt. The partially cured batt is contacted with steam, thereby causing the moisture-responsive fiber binder to swell, become sticky and further bind the fibers. Fiber binders and shaped articles are described.

104 Claims, 5 Drawing Sheets

U.S. PATENT DOCUMENTS

| | | | |
|---|---|---|---|
| 4,874,661 | 10/1989 | Brown | 428/246 |
| 4,900,615 | 2/1990 | Kissell | 428/262 |
| 4,940,513 | 7/1990 | Spendel | 162/112 |
| 4,959,125 | 9/1990 | Spendel | 162/158 |
| 5,026,746 | 6/1991 | Floyd | 524/50 |
| 5,059,282 | 10/1991 | Ampulski | 762/111 |
| 5,095,054 | 3/1992 | Lay | 524/47 |
| 5,100,435 | 3/1992 | Onwumere | 8/115.55 |
| 5,130,394 | 7/1992 | Nguyen | 527/300 |
| 5,164,046 | 11/1992 | Ampulski | 162/111 |
| 5,194,206 | 3/1993 | Koch | 264/115 |
| 5,288,318 | 2/1994 | Mayer | 106/213 |
| 5,290,350 | 3/1994 | Besnard | 106/214 |
| 5,321,100 | 6/1994 | Belder | 525/438 |
| 5,334,639 | 8/1994 | Rice | 524/47 |
| 5,371,194 | 12/1994 | Ferretti | 530/378 |
| 5,393,379 | 2/1995 | Parrinello | 162/101 |
| 5,395,438 | 3/1995 | Baig | 106/214 |
| 5,432,000 | 7/1995 | Young, Sr. et al. | 428/372 |
| 5,444,113 | 8/1995 | Sinclair | 524/306 |
| 5,516,815 | 5/1996 | Buehler | 523/128 |
| 5,525,414 | 6/1996 | Wagers | 428/265 |
| 5,620,509 | 4/1997 | Tampio | 106/162.5 |
| 5,629,416 | 5/1997 | Neigel | 536/106 |
| 5,639,333 | 6/1997 | Krankkala | 156/328 |
| 5,639,865 | 6/1997 | Kalbe | 536/18.5 |
| 5,662,731 | 9/1997 | Andersen | 106/206.1 |
| 5,667,637 | 9/1997 | Jewell | 162/146 |
| 5,736,473 | 4/1998 | Cohen | 442/239 |
| 5,756,556 | 5/1998 | Tsai | 521/84.1 |
| 5,760,118 | 6/1998 | Sinclair | 524/306 |
| 5,770,137 | 6/1998 | Loercks | 264/109 |
| 5,785,817 | 7/1998 | Tan | 162/218 |
| 5,804,005 | 9/1998 | Buck | 156/62.2 |
| 5,840,787 | 11/1998 | West | 524/35 |
| 5,854,345 | 12/1998 | Xu | 525/54.24 |
| 5,861,216 | 11/1999 | Doane | 428/532 |
| 5,883,025 | 3/1999 | Karstens | 442/344 |
| 5,895,804 | 4/1999 | Lee | 525/54.3 |
| 5,911,818 | 6/1999 | Baig | 106/698 |
| 5,928,741 | 7/1999 | Andersen | 428/35.7 |
| 5,939,192 | 8/1999 | Rettenbacher | 428/104 |
| 6,039,821 | 3/2000 | Buck | 156/62.2 |

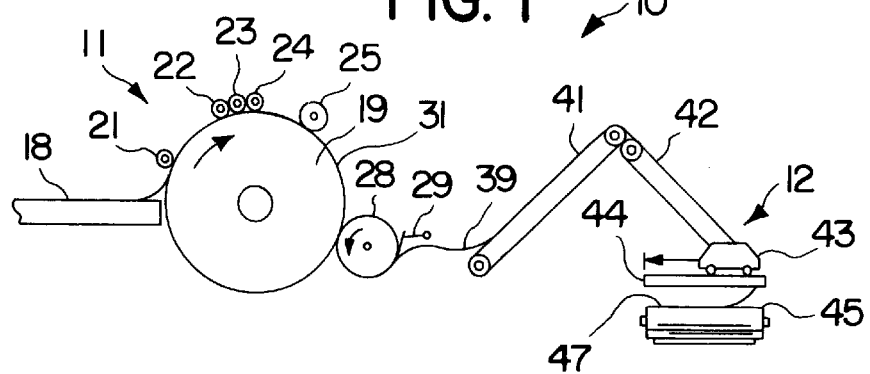
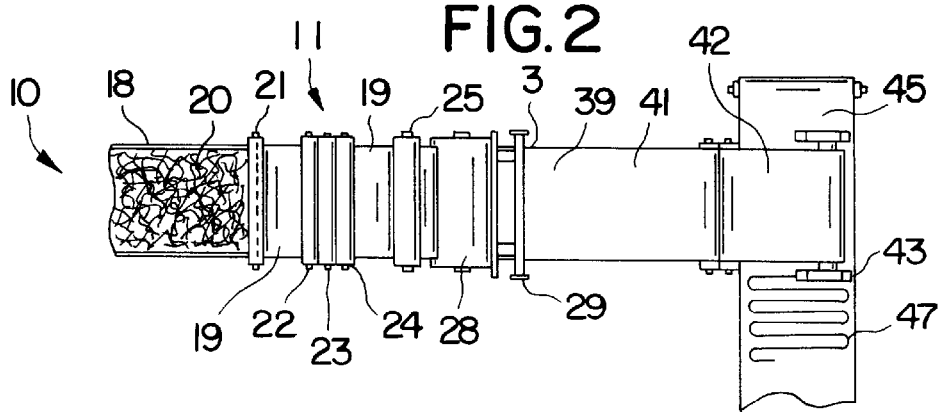
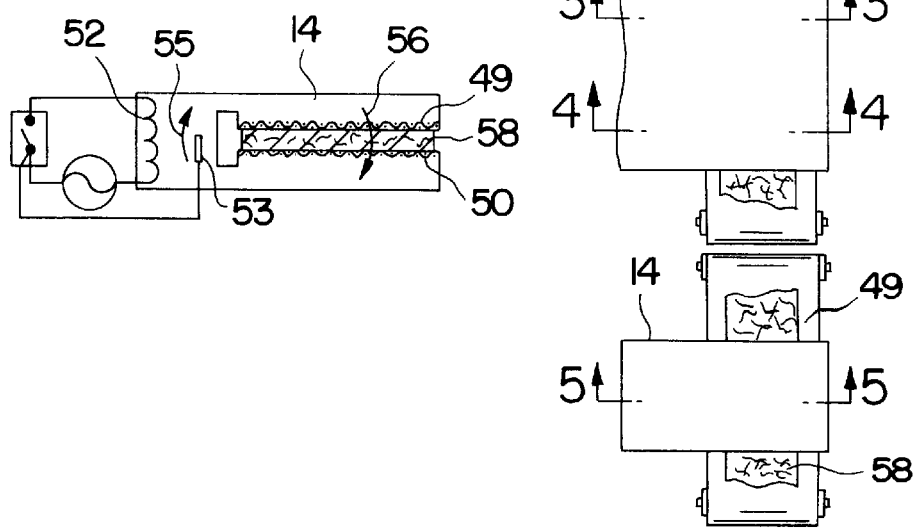

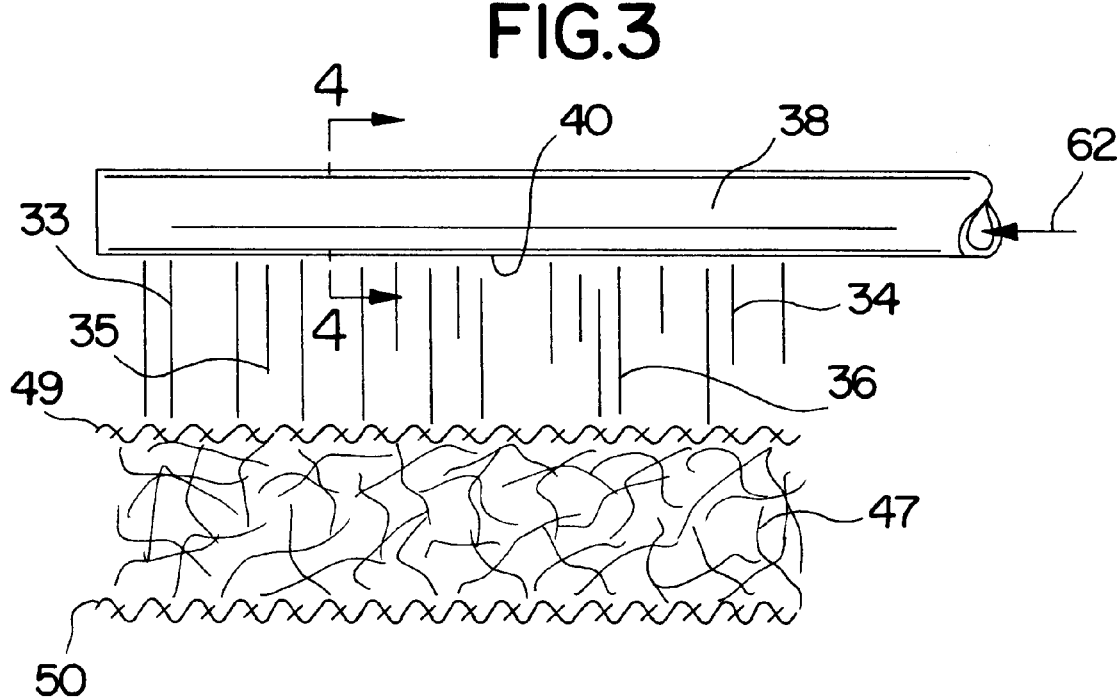
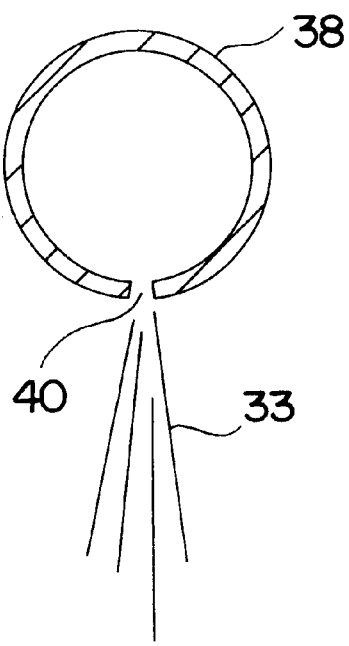

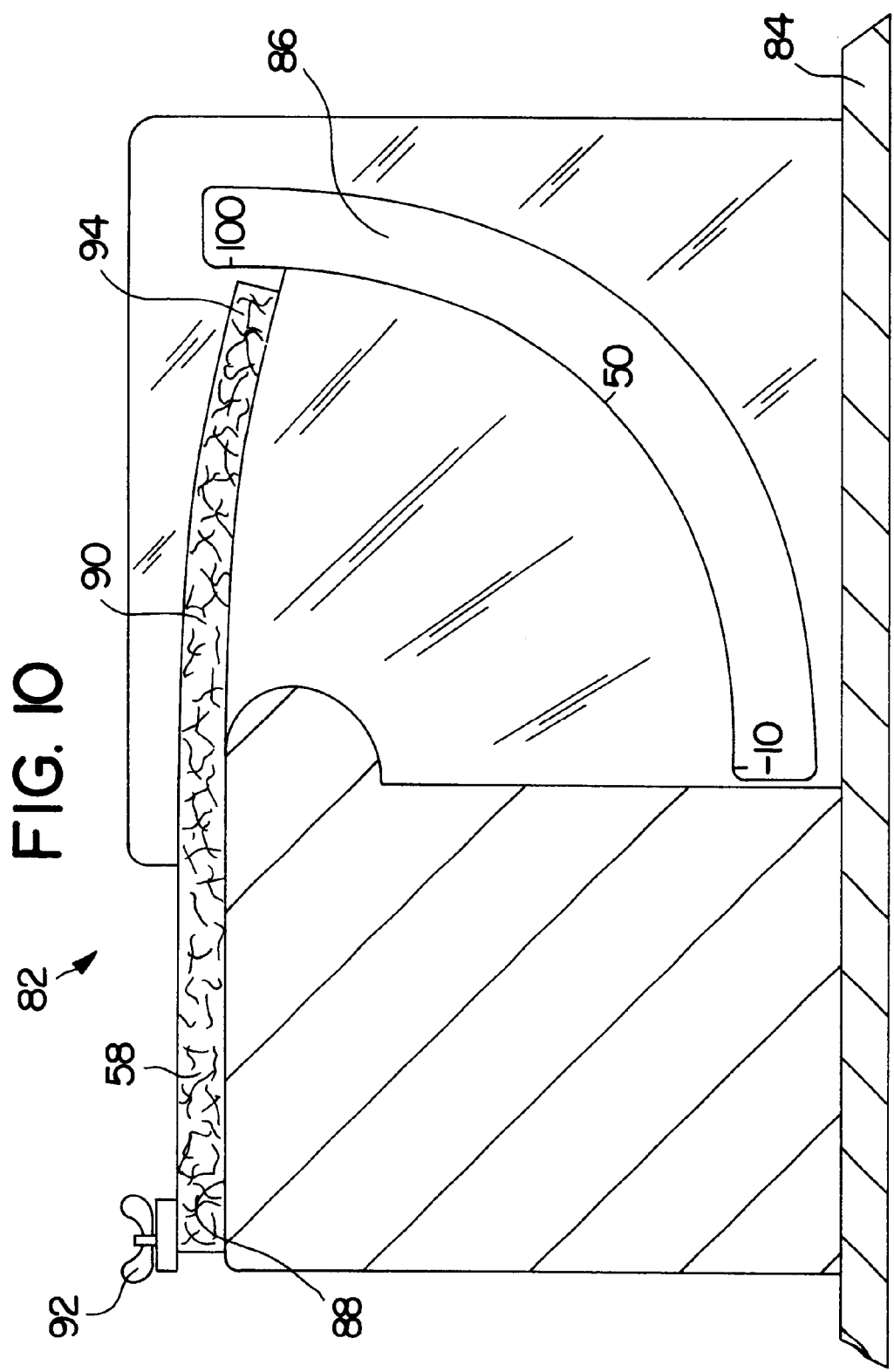

NON-WOVEN FIBROUS BATTS, SHAPED ARTICLES, FIBER BINDERS AND RELATED PROCESSES

FIELD OF THE INVENTION

This invention relates to non-woven fibrous batts, shaped articles, fiber binders and related processes for the production of these fibrous batts and shaped articles.

BACKGROUND OF THE INVENTION

Some years aqo processes were developed for producing fibrous batts by contacting fibers with a dry fiber-binder based on certain thermoplastic polymers. Such processes are described in the following U.S. Patents among others:

Buck et al U.S. Pat. No. 3,993,518, "Buck '518";
Buck et al U.S. Pat. No. 3,997,942, "Buck '942";
Buck et al U.S. Pat. No. 4,047,991, "Buck '991";
Buck et al U.S. Pat. No. 4,050,997, "Buck '997";
Buck et al U.S. Pat. No. 4,051,294, "Buck '294";
Buck et al U.S. Pat. No. 4,053,673, "Buck '673";
Buck et al U.S. Pat. No. 4,053,674, "Buck '674";
Buck U.S. Pat. No. 4,211,817, "Buck '817";
Buck et al U.S. Pat. No. 4,363,680, "Buck '680";
Buck U.S. Pat. No. 4,550,050, "Buck '050";
Buck U.S. Pat. No. 4,457,793, "Buck '793";
Buck et al U.S. Pat. No. 4,473,428, "Buck '428"; and
Elsen U.S. Pat. No. 4,869,950, "Elsen".

These prior processes became commercially successful in the Unites States of America and in a number of overseas countries because of their advantages over the prior art, as set forth in the above patents. However, over the ten or fifteen years of their widespread use the cost of the polyvinylidene-polyvinyl chloride copolymer ("PVDC/PVC copolymer") used in these processes increased dramatically so that these processes became uneconomic. For several years scrap PVDC/PVC copolymers were available but eventually the supply of these materials became insufficient to satisfy the market. In addition certain disadvantages associated with the use of PVDC/PVC copolymers and other chlorinated materials, including corrosion of equipment, restricted the use of these materials in certain applications. Since the PVDC/PVC copolymers were thermoplastic, they suffered from an additional disadvantage in that they could not be hot molded into certain shaped articles useful for example as automobile insulating products.

More recently a new type of dry powder bonding system was developed by this inventor as described in Buck U.S. Pat. No. 5,804,005, (Buck '005) and in Buck U.S. Pat. No. 6,039,821 (Buck '821) and in a number of foreign countries which are signatory to the Patent Cooperation treaty ("PCT"). Several other patents based on the same or similar chemistry are currently pending. Buck '005 and Buck '821 employ epoxy polymers in dry powder form which when distributed throughout a fibrous batt can be advanced to high molecular weights and cured to either the B stage or more fully cured to the C stage by processing methods described in these two patents. The B stage products may be molded into various shapes in a heated mold such as is used to mold phenolic polymers and certain other thermosetting polymers. In order to maintain firmness during and immediately after the hot molding process which may be carried out at 200° to 230° C., catalysts and agents which cause the epoxide chain molecules to cross link with each other must be employed. Examples include trimelletic anhydride, tetracarboxy benzene dianhydride, and other multi-functional cross-linking agents. These agents are quite expensive, however, and even they do not raise the glass transition temperature ($T_g$) of the epoxide polymer sufficiently to hold the molded batt in a firm and rigid position immediately upon its removal from the molding press.

The epoxide polymers themselves are relatively expensive; the cross-linking agents are even more costly; and the results of hot molding are not equivalent to those obtained with phenol formaldehyde or novalac polymers. Consequently these epoxide bonded and molded products, while having the desirable advantages of freedom from phenol or formaldehyde, are not competitive in the market place. In fact, while the process of Buck '005 has achieved commercial success in the USA and a number of other countries, the commercial products have been based on scrap powder paint with an epoxide base. Powders formulated from these materials function very effectively in flat cushion batts and semi-compressed materials and possess many advantages over earlier technologies, including freedom from chlorine, from phenol, from formaldehyde, and from other undesirable bi-products. The batts made from scrap powder paint, which compete effectively with phenolic and novalac polymers in flat, non-molded fibrous batts cannot be molded with the rigidity obtainable with the phenolic polymers.

OBJECTS OF THE INVENTION

The prime object of the current invention is to utilize a bonding material in fine, dry powder form which is inexpensive enough to compete with phenolic polymers and function as well or better in producing the hardness and shape-holding properties of batts bonded with those polymers, yet at the same time is entirely free from the odors, noxious gases, discoloration, and toxicity associated with formaldehyde-containing batts which are widely used in many molded products throughout the world but which are believed to pose a significant health hazard both in processing and in the fibrous products made from them. Surprisingly a method has been discovered, which is described in this invention, which accomplishes these objectives with great satisfaction and effectiveness.

Another object of the present invention is to provide an improved process which is substantially free of one or more of the other disadvantages of the prior processes.

Still another object is to provide an improved process which produces a batt which has an improved flexural strength both when hot and when cold.

An additional object is to provide an improved process for the production of batts and molded articles which exhibit improved tensile strength in the presence of moisture.

Still another object is to provide an improved shaped article.

Yet another object is to provide a fiber binder which can advantageously be used in the process of the present invention.

Additional objects and advantages of the present invention will be apparent to those skilled in the art by reference to the following description and drawings.

BRIEF DESCRIPTION OF THE DRAWINGS

FIG. 1 is an elevation view of an apparatus suitable for practicing the process of the present invention.

FIG. 2 is a plan view of the apparatus of FIG. 1.

FIG. 3 is a sectional view taken along Line 3—3 of FIG. 2.

FIG. 4 is a sectional view taken along Line 4—4 of FIG. 3.

FIG. 5 is a sectional view taken along Line 5—5 of FIG. 2.

FIG. 10 is a schematic representation of a device for measuring bending resistance of the batts and the shaped articles of the present invention.

SUMMARY OF THE INVENTION

Figure 7:
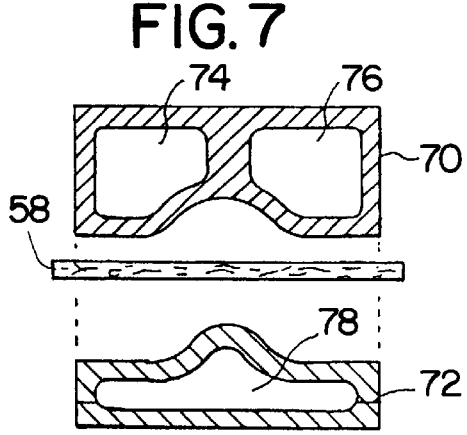
FIG. 7 is a schematic representation of a hot molding process of the present invention with the mold open.

According to the present invention there is provided an improved process for producing a shaped article from a bonded, non-woven, fibrous batt of fibers comprising the steps of:

I. providing a dry, solid, heat-responsive fiber-binder,
II. providing a moisture-responsive fiber-binder which is a dry, solid, particulate, raw, ungelled starch which swells and becomes sticky upon contact with moisture; and then
III. contacting fiber-binding amounts of the heat-responsive fiber-binder with the fibers to form a raw batt with the heat-responsive fiber-binder loosely adhering to the fibers of the batt; and
IV. contacting fiber-binding amounts of the moisture-responsive fiber-binder with the fibers to form a raw batt with the moisture-responsive fiber-binder loosely adhering to the fibers of the batt; and
V. heating the raw batt to a temperature above the binding temperature of the heat responsive fiber-binder but below the melting or scorching point of the fibers thereby activating the heat-responsive fiber-binder whereupon the heat-responsive fiber-binder engages the intersections of the fibers binding the fibers together at their intersections thereby converting the raw batt into a partially cured batt; and
VI. contacting the partially cured batt with water, thereby causing the moisture-responsive fiber binder to swell, become sticky and further bind the fibers.

Steps V and VI can be practiced in the inverse order.

According to another aspect of the present invention, fiber binders which are mixtures of starch and certain polymers are described.

According to still another aspect of the present invention shaped articles, and processes for their production are described.

DETAILED DESCRIPTION OF THE INVENTION

In the broadest aspects of the present invention the heat-responsive polymer can be either thermoplastic or thermosetting. Examples of suitable thermoplastic polymers are given in the first thirteen of the above-described patents.

Thermosetting polymers are preferred because upon curing and cooling they have shape-holding properties. One preferred class of thermosetting polymers are epoxy polymers such as those described in Buck '005 and in Buck '821. Another preferred class of thermosetting polymers are certain polyester polymers as described in U.S. application Ser. No. 09/094,450 filed Jun. 10, 1998, now abandoned entitled "FIBROUS BATTS BONDED WITH THERMOSETTING FIBER-BINDERS OF CERTAIN POLYESTER POLYMERS", the entire disclosure of which is incorporated herein by reference.

The particles of the heat-responsive fiber-binder have an average size from about 0.1 to about 500 microns, preferably from about 1 to about 200 microns and ideally from about 5 to about 50 microns. When the particles have a size smaller than about 10 microns they can advantageously be mixed with particles having a larger size.

The heat-responsive fiber binder can be applied to the fibers in widely varying ratios but the heat-responsive fiber-binder component generally comprises from about one to about 50 and preferably from about 10 to about 30 weight percent based on the combined weight of the fibers and the heat-responsive fiber-binder.

Epoxy polymers, which are useful in the present invention, have epoxide groups by which is meant one or more moieties of Formula I:

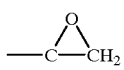

(I)

A large number of epoxy polymers can be employed in the present invention. A preferred class of epoxy polymers is the reaction product of bisphenol-A and epichlorohydrin of Formula II, and V of Buck '005.

The epoxy polymers useful in the present invention generally have an epoxide equivalent weight of from about 500 to about 5000 and preferably from about 600 to about 3000. In the general case wherein they have about two epoxy groups per molecule, the molecular weight is twice the above values.

The epoxy polymer generally has a glass transition temperature, frequently called "Tg", above about 40° C., and preferably above about 50° C., and a melting point above about 70° C. and preferably from about 80° C. to about 150° C.

The epoxy polymer can have a widely varying particle size as long as it is solid. As is well-known in the polymer art, this polymer is a mixture of individual molecules each having a different distinct molecular weight. The average molecular weight of the epoxy polymer is between about 5000 and about 10,000 and is preferably between about 1200 and 6000. The epoxy polymer can be either linear or branched but is preferably linear. It is, however, not cross linked.

The specific cross-linking agents useful with the selected epoxy polymer are well-known. The cross-linking agents have two or more reactive groups which react principally with the epoxide groups of the epoxy polymer. Examples of classes of suitable cross-linking agents include: polycarboxylic acids, polycarboxylic acid anhydrides, acid terminated polyesters, polyfunctional amines, accelerated and substituted dicyandiamide derivatives, imidazole/epoxy polymer adducts, and glycidyl methacrylates. Examples of species of cross-linking agents are given in Buck '005.

The epoxy polymers useful in the present invention can be in any suitable stage but are preferably in either the "A-stage" wherein the mixture is soluble in organic solvents, but is fusible, by which is meant it melts and flows; or in the "B-stage" wherein the mixture is fusible but insoluble.

In the dry fiber binder mixture, the epoxy polymer is mixed with the cross-linking agent in a ratio such that there is about one epoxide group on the epoxy polymer for each carboxyl or amine group on the cross-linking agent. There is no adverse effect if there is up to about 30% excess of either moiety. In other words the equivalent ratio of the epoxy polymer to the cross-linking agent is about 1.3:1 to about 1:1.3. As is well-known in the art, for a given quantity of an epoxy polymer of a given equivalent weight a greater weight of the high molecular weight cross-linking agents must be employed compared to the monomeric cross-linking agents.

With due regard for the above equivalent ratios, the weight ratio of (A) the epoxy polymer to (B) the cross-linking agent, namely the A:B ratio is generally from about 100:3 to about 25:75 and preferably from about 100:4 to about 30:70.

The heat-responsive fiber-binder and the moisture-responsive fiber-binder can be present admixed in widely varying rations but generally are present within a weight ratio of about 1:20 to about 20:1 and preferably from about 2:10 to about 10:2.

The starch useful in the present invention is available all over the world from a variety of well-known sources. Starch is naturally produced by a great number and variety of plants such as rice; waxy rice; potatoes; sago; corn (maize); waxy corn; tapioca; maniac; pea; sorghum; rye; oat; barley and wheat. Starch is contained in the raw plant material in the form of seeds, kernels and/or tubers.

The raw plant material containing raw starch is converted to ground raw starch by grinding and removing skins, husks and other parts of the plant which have a low starch content. The ground raw starch can be produced by the dry-milled process or the wet-milled process. This ground raw starch contains varying amounts of amylopectin and amylose depending on the source. Corn (maize) starch is a preferred starch. Corn starch contains about 30 to 70 percent by weight amylose; balance essentially amylopectin.

The starch useful in this invention need not be pure starch, it can be flour obtained directly from the milling process.

The term "raw starch" as used herein does not include "destructurized starch" as described for example in Lay et al U.S. Pat. No. 5,095,054 ("Lay").

The starch useful in the present invention can be used in a wide variety of particle sizes but generally has a particle size from about 0.1 to about 200 microns, preferably from about one to about 50 microns. As the particle sizes increase, binding efficiency tends to decrease since fewer particles per unit weight are available for binding the fibers.

The moisture-responsive fiber-binder in the dry binder mixture can be applied to the fibers in widely varying ratios but the moisture-responsive fiber-binder generally comprises from about one to about 50 and preferably from about 10 to about 30 weight percent based on the combined weight of the fibers and the moisture-responsive fiber-binder.

The heat-responsive fiber-binders of the present invention are solid. They are neither aqueous solutions, nor are they solutions employing other solvents. They are free of solvents, free of water and free of formaldehyde.

It is well-known in the art to add fillers to the dry binder mixture. Fillers are usually less expensive than polymers or starch. This permits a filled product to be sold at a cost lower than the cost of the pure product.

In general the fillers are inorganic and are insoluble in water. Salts of strong acids and weak bases are suitable as well as salts of weak acids and weak bases. Silica, alumino silicates and alumina are all suitable classes. Examples of preferred fillers include, among others, calcium carbonate, barium sulfate, iron oxides, carbon black, and titanium dioxide.

The binder can include a wide variety of other additives. Examples of additives include among others: catalysts, dyes, pigments, biocides, flow control agents, fire-retardants, self extinguishing agents, desiccants and all manner of additives which are used herein for their known purposes. Examples of fire retardants include: borax, boric acid phosphoric acid, monoammonium phosphate, diammonium phosphate and aluminum trihydrate. Biocides include fungicides, insecticides and rodenticides. These additives can be in the form of liquids or particles so long as the heat-responsive fiber-binder remains solid, has the desired particle size, and suffers no adverse affects.

The dry binder mix can contact the fibers in a wide variety of ways. The fibers can be loose, in the form of a thin web, or in the form of a batt. The dry binder mix fiber binder can be sprinkled on the fibers under the influence of gravity or can be entrained in a stream of gas or vapor, advantageously air. Any method which leaves the desired quantity of dry binder mix uniformly distributed throughout the batt is acceptable.

A wide variety of other methods can be employed to contact the fiber-binder with the fibers. Another method performs the contacting of the fibers with the fiber-binder after the fibers have been opened and loosened from a compressed bale and at the stage when they are entrained in an air stream and prior to being deposited on a screen or in the slot of an air lay system for producing non-woven batts. Such air-lay systems of this type are well-known in the trade under the names Schirp, Rando Web, DOA, Fehrer, and others. Still another suitable method for contacting the fibers with the fiber-binder is described in Fleissner U.S. Pat. No. 3,765,971.

Instead of contacting the fibers with the fiber-binder while the fibers are in the form of a web as described above with reference to the figures, the non-woven batt can be formed into its final form and the particulate fiber-binder blown through the entire batt.

A wide variety of fibers are useful in the present invention including both natural and synthetic fibers. Natural fibers include those like cotton, wool, jute, hemp, flax, sisal and kenaf. The synthetic fibers can be organic or inorganic. Examples of organic synthetic fibers include those of polyester, nylon, acrylic, rayon, and polypropylene. Examples of inorganic synthetic fibers include those of glass or mineral wool. In fact, any fiber or mixture of fibers in which the fiber may be new, unused fibers known as virgin fibers or waste fibers reclaimed from garment cuttings, fiber manufacture or textile processing and which do not melt or decompose at temperature below 100° C. (212° F.) can be employed. Relatively inexpensive fibers are those know in the trade as "shoddy". Shoddy is typically a mixture of fibers reclaimed from garment cuttings and may consist of both man-made and natural fibers in any ratio. The fibers generally have a denier of about 1 to about 200 and preferably from about of 1 to about 22 although finer and coarser fibers are also sometimes useful.

In that embodiment wherein the fiber-binder is a low-melt fiber, no polymeric fiber-binder is necessary to form the partially cured batt. The low-melt fiber has a melting point below about 150° C. (300° F.) whereas the other fibers have a melting point above this. It is most desirable to have a difference of at least about 10° C. (18° F.) and preferably about 40° C. (72° F.) between the melting point of the low-melt fiber and the melting point of the high-melt fiber.

The heating of raw batt containing the fibers and the fiber binder mix of heat responsive fiber-binder and a starch can be accomplished by any convenient means such as infra-red, microwave or conduction but is most conveniently accomplished by hot air which is passed through the batt. This hot air is heated to a temperature above the melting point of the heat-responsive fiber-binder but below that temperature at which the fibers are adversely affected. Such adverse effects include scorching of cellulosic or wool fibers or melting or shrinking of synthetic polymer fibers. The heating is generally done at a temperature of from about 80° C. (175° F.) to about 250° C. (480° F.), and preferably at a temperature of from about 95° C. (205° F.) to about 215° C. (420° F.). The heating is continued for a time sufficient to permit the heat-responsive fiber-binder component to engage the intersections of the fibers and to cross link there. This is generally accomplished in from about twenty seconds to about ten minutes, and usually from one to five minutes. This heating converts the raw batt into a hot semi-cured batt.

The partially cured batt is contacted with steam in a variety of methods. One method is to spray water onto the surface of the partially cured batt, and then place the batt in a heated mold in a press. The water is added to the batt in an amount sufficient to swell the starch and generally in a weight ratio of water to starch of from about 1:10 to about 10:1. These ratios are generally achieved when water is added to the partially cured batt in a weight ratio of generally from about 1:20 to about 2:1, and preferably from about 1:10 to about 1:1.

Another method for contacting the partially cured batt with steam is to first place the partially cured batt between mold halves of a mold in the press and cause saturated or super heated steam to pass through the batt. The steam is employed in an amount and for a time just sufficient to cause the moisture-responsive fiber-binder to swell, become sticky and further bind the fibers to one another at their intersections. This generally occurs within about one-half minute to about 10 minutes, but frequently occurs within about one to five minutes. Longer times are not harmful but are unnecessary.

The steam is removed from the batt and the press in any convenient means such as by providing steam escape channels in the mold halves. Removal of the moisture leaves the starch as a hard, rigid binder which holds the molded form of the batt even while hot.

After completion of the heating step, the hot batt is removed from the press and cooled, whereupon the heat-responsive fiber-binder hardens and provides toughness to the batt thereby producing a tough, dimensionally-stable shaped article. Thus the finished part is held in shape by the combination of both binders in the fiber binding mixture.

DETAILED DESCRIPTION OF THE DRAWINGS

Referring now to the drawings and in particular to FIGS. 1 and 2, there is shown an apparatus 10 useful for practicing the process of the present invention. The apparatus 10 comprises an opener or garnet 11, a cross-laying mechanism 12, an applicator 13 for the mixture of fiber binders, and an oven 14. The garnet 11 comprises an inlet chute 18 adapted to feed bulk fibers to the rotating drum 19 of the garnet 11. The garnet 11 is also provided with a plurality of tooth rolls 21, 22, 23, 24, 25 which together with the teeth (not shown) on the drum 19, take bulk fibers 20 and convert them to a web 31 which adheres to the drum 19. The web 31 adhering to the drum 19 is transferred to the drum 28 where it is removed by comb 29. The web 39 that is now only between one and 100 fibers thick and is barely self-supporting, now leaves the garnet 11.

The web 39 then goes to the conveyor 41 and thence to the conveyor 42. In a manner well-known in the art, the lower end of the conveyor 42 is attached to a traveler 43 which moves hack and forth on the track 44.

The conveyor 42 is positioned above and at right angles to yet another conveyor 45. The apparatus 10 is adjusted such that the speed of the conveyor 42 is several times faster than the speed of the conveyor 45. By virtue of this speed difference, the web 39 is cross laid back and forth on the conveyor 45 thus forming a raw batt 47. The raw batt 47 passes between an upper foraminous belt 49 and a lower foraminous belt 50 (See FIGS. 3, 4, and 5). While held between the belts 49, 50, the raw batt 47 passes into the polymer applicator 13.

The applicator 13, shown in the drawings, is commercially available from Ramcon-Fiberlok, Inc. of Memphis Tenn., USA, under the trade name "System Six". The System Six applicator is designed to apply either polymer or a polymer mixture uniformly to an entire batt. The whole system consists of a mixing or blending tank (not shown) for the polymer or polymer mixture and means (not shown) for conveying this material to the applicator. The applicator 13 itself is a double-walled chamber about the size of a small room in which the polymer or polymer mixture is conveyed downward through slots extending the full width of the batt and a means for collecting any mixture which passes through the batt. This mixture is enriched by additional polymer from the mixing tank (not shown) and forced by air upward through similar slots extending across the width of the batt. A collector above the batt draws off any mixture which has not been taken up by the batt and carries it to a bag filter collector (not shown) where it is separated from any entrained fibers and screened, thereafter being returned to the mixing supply tank (not shown). The applicator 13 has an efficiency of better than 95% in the polymer mixture applied and prevents any dust from escaping into the environment.

FIGS. 3 and 4 shows the manner in which the raw batt 47 is contacted with the mixture of heat responsive polymer particles 33, 34 and starch particles such as the particles 35, 36. A quantity of heat-responsive polymer is mixed with a quantity of starch in a vessel (not shown) to form a fiber-binder mixture containing polymer particles such as the particles 33, 34, and starch particles such as the particles 35, 36. This fiber-binder mixture is mixed with air under pressure which is conveyed to a wand 38 positioned above the raw batt 47. The length of the wand 38 is transverse to the direction of advance of the raw batt 47. This fiber-hinder mixture is provided to the wand 38 as shown by the arrow 62. The fiber-binder mixture is then sprayed vertically downwardly onto the raw batt 47 through a slot 40 (See FIG. 4) which extends along the length of the wand 38 and therefore across the raw batt 47. The air with entrained polymer and starch particles passes through the raw batt 47. While passing through the batt 47 most of the particles are retained uniformly within the batt. The air is collected by means (not shown) as it leaves the batt.

Any polymer and starch mixture not taken up by the batt is carried to a bag house collector (not shown) from which it is screened from fibers and the good polymer and starch mixture is returned to the applicator 13.

FIG. 5 shows the oven 14 which is provided with heating means, such as electrical resistance 52. The temperature within the oven 14 can be controlled by a thermostat 53. The oven 14 is also provided with air circulating means such as a fan (not shown) that causes the hot air to circulate in the direction shown by the arrows 55 and 56. This hot air heats and melts the particles 33, 34 of the heat-responsive fiber-binder causing them to engage the intersections of the fibers and further causes them to cross link thereby hardening the heat-responsive fiber-binder. The resultant product is the partially cured batt 58. The partially cured batt 58 in which the heat responsive polymer is in the B stage, leaves the oven. This batt may have a widely varying density but generally has a density of from about 0.004 to about 0.4 and preferably from about 0.01 to about 0.1 grams per cubic centimeter.

Figure 6:
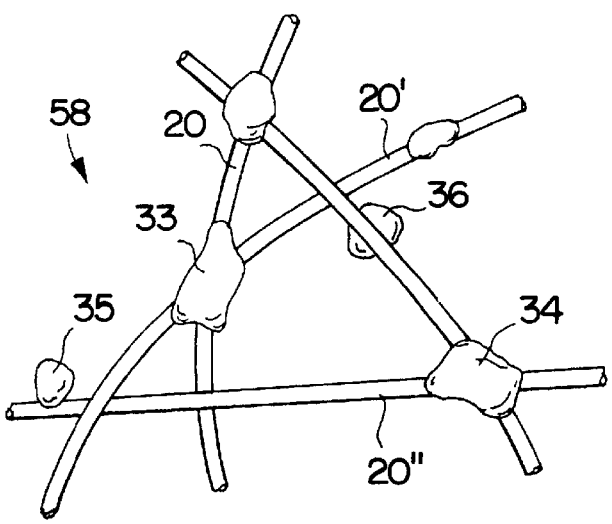
FIG. 6 shows a portion of the partially cured batt of the present invention.

FIG. 6 shows a portion of the partially cured batt 58, as it leaves the oven 14. Polymer particles such as the particles 33, 34 adhere to fibers 20, 20', 20". The polymer particles 33, 34 have melted and have engaged the intersections of the fibers 20, 20', 20". The batt 58 also has adhering to the fibers 20, 20', 20", starch particles, such as the particles 35, 36. These starch particles 35, 36 adhere to the fibers, such as the fibers 20, 20', 20", but do not, at this stage of the process, bind the fibers together.

FIG. 7 illustrates the hot molding of batts of the present invention. The partially-cured batt 58 is placed between an open male mold half 70 and an open female mold half 72. The male mold half 70 may be provided with passages 74, 76, adapted to receive a heated fluid such as steam or hot oil. Similarly the female mold half 72 has a fluid receiving passage 78. The two mold halves 70, 72 together form a mold.

Figure 8:
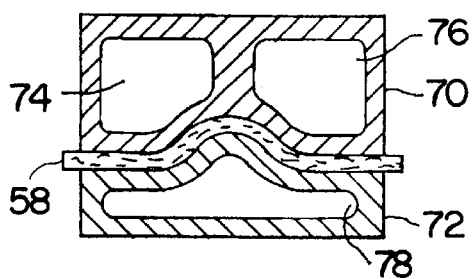
FIG. 8 is a schematic representation of a hot molding process of the present invention with the mold closed.

In FIG. 8, the mold halves 70, 72 are closed causing the partially-cured batt 58 to take the form of the mold halves 70, 72. Steam is created in situ while the mold halves 70, 72 are together. The steam can be created by any convenient means. One means is to spray the partially cured batt 58 with a quantity of water prior to placing the batt 58 between the mold halves 70, 72. With the mold halves 70, 72 heated to temperatures well above 100° C. (212° F.), and preferable above 200° C. (392° F.), the sensible heat of the mold halves 70, 72 converts any water to steam and first swells while further curing the polymer as the steam escapes the mold through holes or slots in the bottom mold (not shown). Contacting the partially cured batt 58 with steam converts the partially cured batt 58 into a fully cured batt in the form of shaped article 80 shown in FIG. 9. The article 80 gains additional strength and toughness when it is removed from the mold and the heat responsive polymer is allowed to cool and become hard.

The temperature of the mold halves 70, 72 can vary widely but generally they are heated to a temperature of from about 200° C. (392° F.) to about 230° C. (450° F.)

Figure 9:
FIG. 9 is a shaped article of the present invention.

FIG. 9 shows the shaped article 80.

FIG. 10 shows a measuring device 82 which can be used to test the bending resistance of partially and fully cured batts of the present invention as well as shaped articles. The device 82 has a base 84 carrying a scale 86 and a flat horizontal surface 88. A sample to be tested, such as the pad 58 is selected and immediately upon its removal from the press is placed in the apparatus shown in FIG. 10 wherein 20 centimeters of the article is held in a horizontal position while the remaining 28 centimeters is allowed to deflect downwards of its own weight and the amount of deflection (interpreted as sample firmness) read from the scale 86 of the apparatus 82. An article which shows no deflection would have a reading of 100 units and an article which deflects so much that it hangs down vertically which show a deflection of −10 units. In the embodiment shown in FIG. 10 the batt 58 has a bending resistance of about 90 to 95%. In the case of stiff cold batts, a weight can be added to the end 94 of the sample 90. The mass of this weight is recorded as part of the measuring procedure. The test sample 90 can be held in place by the clamp 92.

Figure 11:
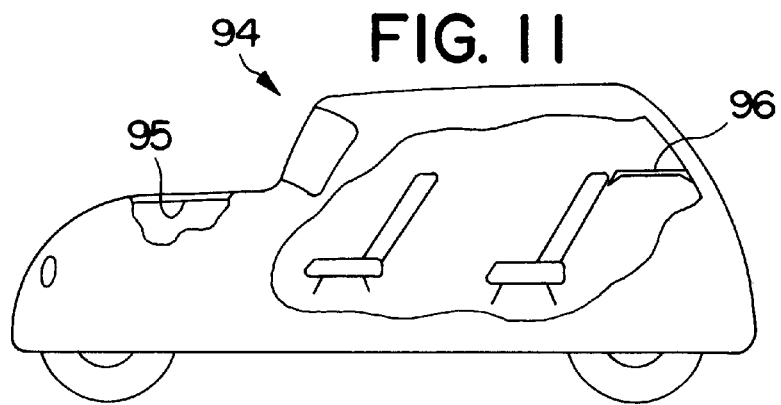
FIG. 11 is a schematic representation of an automobile containing a shaped article of the present in the form of a package tray.

FIG. 11 shows an automobile 94 with installed hood liner 95 and package tray 96.

Figure 12:
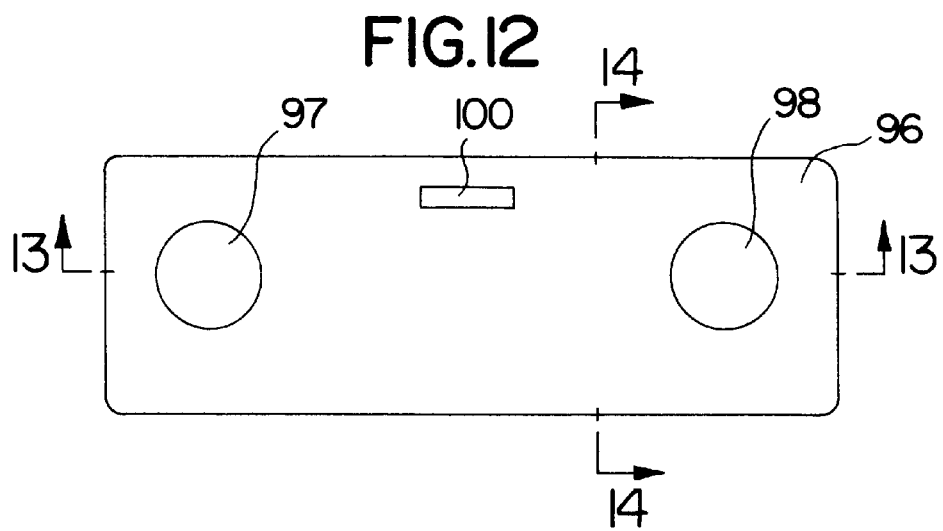
FIG. 12 is a top view of the package tray shown in FIG. 11, but on a larger scale.
Figure 13:
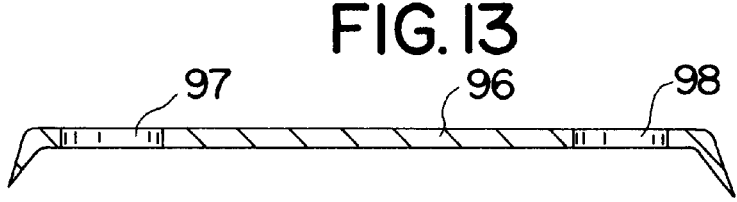
FIG. 13 is sectional view taken along Line 13—13 of FIG. 12.
Figure 14:
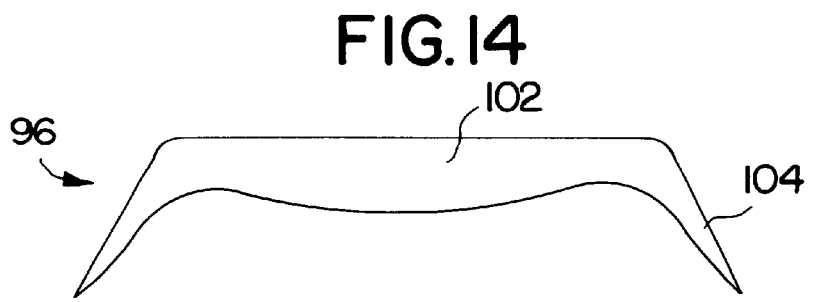
FIG. 14 is a sectional view taken along Line 14—14 of FIG. 12, but on a larger scale.

FIGS. 12, 13, and 14 show the automobile package tray 96 which has holes, 97, 98 adapted to receive stereo speakers and hole 100 adapted to receive a brake light.

FIG. 14, which is on an enlarged scale compared to that of FIG. 13, shows that the package tray 96 has a central portion 102 that is wider than the end portion 104. Even considering this difference in thickness the number of fibers per square inch of surface area and the amount of fiber-binder per square inch of surface area is substantially the same.

EXAMPLES

The following abbreviations are used throughout the examples presented below:

"B. Fiber" means low-melting polypropylene binder-fiber.

"HPT Stch" means Hydroxypropyl tapioca starch.

"W. Stch" means Wheat starch.

"C. Stch" means Corn starch.

"T. Stch" means Tapioca starch.

"FL" means Flex-Lok® S4000 which is a mixture of epoxy and epoxy-polyester scrap powder paints sold by RAMCON-Fiberlok, Inc. of Memphis, Tenn.

"B3" means Buckite® 3 which is an epoxy polymer formulated with Shell Chemical Epon epoxy polymer and Epicure P-101 epoxy hardener. Buckite® 3 is sold by RAMCON-Fiberlok, Inc. of Memphis, Tenn.

"FL033" means a vinyl chloride-vinyl acetate based thermoplastic powdered polymer sold by Ramcon-Fiberlok, Inc. of Memphis Tenn. under the trade name FL-033.

"ptime" means press time in minutes.

"Water%" means weight percent of water added to the batt prior to pressing, based on total weight of fibers, fiber-binders and water.

"load%" means weight percent of sample that is fiber-binder.

"Wt." means weight in grams of the 48 cm×48 cm sample.

"Thick" means thickness in millimeters of the 48 cm×48 cm sample after pressing.

"HF" means hot flex and is the relative flexibility of the 48 cm×48 cm sample as measured immediately after removing from the hot press using the flexibility apparatus 82. The scale is from 100 units (no flexibility) to −10 units (complete flexibility).

"CF" means cold flex; and is the relative flexibility of the 48 cm×48 cm sample measured when the sample is at room temperature and with a 454 gram weight attached to the outer edge of the sample on the flexibility measuring apparatus 82. The scale is from 100 units (no flexibility) to −10 units (complete flexibility).

"Fiber Binder" means the particular fiber-binder used in the example. Where the fiber-binder is preceded by a number, the relative percent of ingredient is indicated. For example, 80FL/20C.Stch represents 80 weight percent Flex-Lok® S4000 Fiber-Binder and 20 weight percent corn starch as a mixture.

The invention will be better understood by reference to the following examples wherein all parts and percentages are by weight unless otherwise indicated. These examples are designed to teach those skilled in the art how to practice the present invention and give the best mode presently known for practicing the present invention.

Inventive Example 1

In this example, and in each of the examples which follow, the inventive and comparative batts were prepared in exactly the same way on the RAMCON-Fiberlok apparatus 10 shown in FIGS. 1 and 2. The fiber or fiber mix was placed on the feed chute 18 and processed through the garnet 11 which formed a fiber web 61 centimeters wide. This web 39 was carried on the cross-laying mechanism 12 where it is cross-laid on a conveyor 45 to form a loose fiber batt. The batt was then carried forward on a conveyor running at right angles to the direction in which the web was produced and carried through the system-six applicator 13. Here the amount of inventive fiber-binder polymer and starch mixture was entrained in an air stream and applied to the batt from both above and below. The comparative binders were applied in the same way. The resultant uncured batt was passed through the oven 14 at a temperature of 121° C. where the residence was one minute resulting in a partially cured batt 58 shown emerqing from the oven 14.

Subsequently the batt sample is cut into 48×48×2.5 centimeter samples which are sprayed on the top and bottom surfaces with water evenly distributed so that they contain the amount of absorbed water shown in the example. Two moistened batts are placed on top of each other in a hydraulic press between two heated platens. Teflon woven fabrics are used above and below the batts to prevent sticking. The bottom platen of the press is equipped with narrow slots to allow steam to escape during the pressing process. The batts are pressed together at 204° C. for two to five minutes as shown in each example to a thickness of 3.2 millimeters to 4.8 millimeters, also shown in each example. The hot molded non-woven shaped article is removed from the hot press and immediately placed in the measuring device 82 shown in FIG. 10 wherein 20 centimeters of the shaped article is held in a horizontal position while the remaining 28 centimeters is allowed to deflect downwards of its own weight. The amount of deflection is read from the scale 86 of the device 82. A shaped article which shows no deflection would have a reading of 100 units and an article which deflects so much that it hangs down vertically would show a deflection of −10 units.

After the shaped article has cooled to room temperature it is again placed in the device 82 of FIG. 10 and a 454 gram weight is attached along the overhanging edge of the 48 centimeter×48 centimeter piece, and the cold deflection is measured in the same way as described above.

For samples described in example 1 shoddy fiber is used. The shoddy used in this example is a mixture of fibers reclaimed from old clothing and other sources. It is about 60% by weight synthetic fibers and 40% by weight cotton. The synthetic fibers are a mixture of fibers of poly(ethylene terephthalate), nylon and acrylic. The test results are shown below.

| Fiber-Binder | Load % | Water % | wt. | Thick | Ptime | HF | CF |
|---|---|---|---|---|---|---|---|
| 80FL/20 C. Stch | 25 | 19.5 | 536 | 3.2 | 5 min | 82 | 74 |

Inventive Example 2

The procedure of example 1 is repeated including times, temperatures, ingredients, etc.

| Fiber-Binder | Load % | Water % | wt. | Thick | Ptime | HF | CF |
|---|---|---|---|---|---|---|---|
| 80FL/20 C. Stch | 25 | 37 | 513 | 3.2 | 5 min | 86 | 81 |

Inventive Example 3

The procedure of example 1 is repeated including times, temperatures, ingredients, etc.

| Fiber-Binder | Load % | Water % | wt. | Thick | Ptime | HF | CF |
|---|---|---|---|---|---|---|---|
| 80FL/20 C. Stch | 25 | 23 | 477 | 4.8 | 5 min | 80 | 82 |

Inventive Example 4

The procedure of example 1 is repeated including times, temperatures, ingredients, etc.

| Fiber-Binder | Load % | Water % | wt. | Thick | Ptime | HF | CF |
|---|---|---|---|---|---|---|---|
| 80FL/20 C. Stch | 25 | 35.2 | 536 | 4.8 | 5 min | 90 | 89 |

Inventive Example 5

The procedure of example 1 is repeated including times, temperatures, ingredients, etc.

| Fiber-Binder | Load % | Water % | wt. | Thick | Ptime | HF | CF |
|---|---|---|---|---|---|---|---|
| 70FL/30 C. Stch | 25 | 21.2 | 481 | 3.2 | 5 min | 81 | 71 |

Inventive Example 6

The procedure of example 1 is repeated including times, temperatures, ingredients, etc.

| Fiber-Binder | Load % | Water % | wt. | Thick | Ptime | HF | CF |
|---|---|---|---|---|---|---|---|
| 70FL/30 C. Stch | 25 | 33.3 | 477 | 3.2 | 5 min | 87 | 75 |

Inventive Example 7

The procedure of example 1 is repeated including times, temperatures, ingredients, etc.

| Fiber-Binder | Load % | Water % | wt. | Thick | Ptime | HF | CF |
|---|---|---|---|---|---|---|---|
| 70FL/30 C. Stch | 25 | 21 | 495 | 4.8 | 5 min | 82 | 84 |

Inventive Example 8

The procedure of example 1 is repeated including times, temperatures, ingredients, etc.

| Fiber-Binder | Load % | Water % | wt. | Thick | Ptime | HF | CF |
|---|---|---|---|---|---|---|---|
| 70FL/30 C. Stch | 25 | 39.4 | 499 | 4.3 | 5 min | 92 | 87 |

Inventive Example 9

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 25 | 21.5 | 495 | 3.2 | 5 min | 81 | 70 |

Inventive Example 10

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 25 | 24.8 | 404 | 3.2 | 5 min | 78 | 64 |

Inventive Example 11

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 25 | 34.2 | 463 | 3.2 | 5 min | 91 | 73 |

Inventive Example 12

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 25 | 20.1 | 468 | 3.2 | 3 min | 84 | 76 |

Inventive Example 13

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 25 | 22.5 | 449 | 3.2 | 3 min | 84 | 73 |

Inventive Example 14

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 25 | 20.5 | 518 | 3.2 | 3 min | 84 | 78 |

Inventive Example 15

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 24.5 | 21.8 | 490 | 3.2 | 3 min | 87 | 78 |

Inventive Example 16

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 24.5 | 21.3 | 468 | 3.2 | 3 min | 86 | 74 |

Inventive Example 17

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 24.5 | 20.9 | 458 | 3.2 | 3 min | 85 | 74 |

Inventive Example 18

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 25 | 19.4 | 527 | 4.8 | 5 min | 80 | 81 |

Inventive Example 19

The procedure of example 1 is repeated including times, temperatures, ingredients, etc.

| Fiber-Binder | Load % | Water % | wt. | Thick | Ptime | HF | CF |
|---|---|---|---|---|---|---|---|
| 60FL/40 C. Stch | 25 | 34.6 | 468 | 4.8 | 5 min | 92 | 82 |

Inventive Example 20

The procedure of example 1 is repeated including times, temperatures, ingredients, etc.

| Fiber-Binder | Load % | Water % | wt. | Thick | Ptime | HF | CF |
|---|---|---|---|---|---|---|---|
| 50FL/50 C. Stch | 25 | 17.6 | 531 | 3.2 | 5 min | 86 | 76 |

Inventive Example 21

The procedure of example 1 is repeated including times, temperatures, ingredients, etc.

| Fiber-Binder | Load % | Water % | wt. | Thick | Ptime | HF | CF |
|---|---|---|---|---|---|---|---|
| 50FL/50 C. Stch | 25 | 31.5 | 536 | 3.2 | 5 min | 91 | 81 |

Inventive Example 22

The procedure of example 1 is repeated including times, temperatures, ingredients, etc.

| Fiber-Binder | Load % | Water % | wt. | Thick | Ptime | HF | CF |
|---|---|---|---|---|---|---|---|
| 50FL/50 C. Stch | 25 | 22.2 | 499 | 4.8 | 5 min | 83 | 81 |

Inventive Example 23

The procedure of example 1 is repeated including times, temperatures, ingredients, etc.

| Fiber-Binder | Load % | Water % | wt. | Thick | Ptime | HF | CF |
|---|---|---|---|---|---|---|---|
| 50FL/50 C. Stch | 25 | 34.8 | 522 | 4.8 | 5 min | 94 | 88 |

Inventive Example 24

The procedure of example 1 is repeated including times, temperatures, ingredients, etc. except in example 24 low-melting polypropylene binder-fiber is mixed with the shoddy fiber to give an approximately 80% shoddy, 20% low-melt fiber blend. No thermoset or thermoplastic particulate binder is used with the corn starch in example 24.

| Fiber-Binder | Load % | Water % | Wt | Thick | Ptime | HF | CF |
|---|---|---|---|---|---|---|---|
| C. Stch | 25 | 16.5 | 563 | 3.2 | 5 min | 79 | 70 |

Inventive Example 25

The procedure of example 1 is repeated including times, temperatures, ingredients, etc. except in example 25 low-melting polypropylene binder-fiber is mixed with the shoddy fiber to give an approximately 80% shoddy, 20% low-melt fiber blend. No thermoset or thermoplastic particulate binder is used with the corn starch in example 25.

| Fiber-Binder | Load % | Water % | Wt | Thick | Ptime | HF | CF |
|---|---|---|---|---|---|---|---|
| C. Stch | 25 | 29.7 | 558 | 3.2 | 5 min | 86 | 69 |

Inventive Example 26

The procedure of example 1 is repeated including times, temperatures, ingredients, etc. except in example 26 low-melting polypropylene binder-fiber is mixed with the shoddy fiber to give an approximately 80% shoddy, 20% low-melt fiber blend. No thermoset or thermoplastic particulate binder is used with the corn starch in example 26.

| Fiber-Binder | Load % | Water % | Wt | Thick | Ptime | HF | CF |
|---|---|---|---|---|---|---|---|
| C. Stch | 25 | 30.3 | 572 | 4.8 | 5 min | 91 | 82 |

Inventive Example 27

The procedure of example 1 is repeated including times, temperatures, ingredients, etc. except in example 27 an off-line steam generation and application apparatus is used to apply moisture to the batts prior to molding.

| Fiber-Binder | Load % | Water % | Wt. | Thick | Ptime | HF | CF |
|---|---|---|---|---|---|---|---|
| 60EL/40 C. Stch | 25 | 10.7 | 513 | 3.2 | 5 min | 65 | 69 |

Inventive Example 28

The procedure of example 1 is repeated including times, temperatures, ingredients, etc. except in example 28 an off-line steam generation and application apparatus is used to apply moisture to the batts prior to molding.

| Fiber-Binder | Load % | Water % | Wt. | Thick | Ptime | HF | CF |
|---|---|---|---|---|---|---|---|
| 60FL/40 C. Stch | 25 | 31 | 490 | 3.2 | 5 min | 87 | 74 |

Inventive Example 29

The procedure of example 1 is repeated including times, temperatures, ingredients, etc. except in example 29 an off-line steam generation and application apparatus is used to apply moisture to the batts prior to molding.

| Fiber-Binder | Load % | Water % | Wt. | Thick | Ptime | HF | CF |
|---|---|---|---|---|---|---|---|
| 60FL/40 C. Stch | 25 | 11 | 554 | 3.2 | 5 min | 77 | 76 |

Inventive Example 30

The procedure of example 1 is repeated including times, temperatures, ingredients, etc. except in example 30 an off-line steam generation and application apparatus is used to apply moisture to the batts prior to molding.

| Fiber-Binder | Load % | Water % | Wt. | Thick | Ptime | HF | CF |
|---|---|---|---|---|---|---|---|
| 350FL/50 C. Stch | 25 | 5.2 | 499 | 3.2 | 5 min | 66 | 65 |

Inventive Example 31

The procedure of example 1 is repeated including times, temperatures, ingredients, etc. except in example 31 an off-line steam generation and application apparatus is used to apply moisture to the batts prior to molding.

| Fiber-Binder | Load % | Water % | Wt. | Thick | Ptime | HF | CF |
|---|---|---|---|---|---|---|---|
| 80FL/20 C. Stch | 25 | 23.1 | 549 | 3.2 | 3 min | 84 | 81 |

Inventive Example 32

The procedure of example 1 is repeated including times, temperatures, ingredients, etc. except in example 32 an off-line steam generation and application apparatus is used to apply moisture to the batts prior to molding.

| Fiber-Binder | Load % | Water % | Wt. | Thick | Ptime | HF | CF |
|---|---|---|---|---|---|---|---|
| 60FL/40 C. Stch | 25 | 18.5 | 563 | 3.2 | 3 min | 84 | 79 |

Inventive Example 33

The procedure of example 1 is repeated including times, temperatures, ingredients, etc. except in example 33 an off-line steam generation and application apparatus is used to apply moisture to the batts prior to molding.

| Fiber-Binder | Load % | Water % | Wt. | Thick | Ptime | HF | CF |
|---|---|---|---|---|---|---|---|
| 60FL/40 C. Stch | 25 | 19.7 | 549 | 3.2 | 3 min | 86 | 80 |

Comparative Example 34

The procedure of inventive example 1 is repeated including times, temperatures, ingredients, etc. except in comparative example 34 no thermoset or thermoplastic binder is used in conjunction with the corn starch. Because no thermoplastic or thermoset binder is used in the process, the resultant batts are very fragile and great care is taken when handling, cutting and pressing the batts.

| Fiber-Binder | Load % | Water % | Wt. | Thick | Ptime | HF | CF |
|---|---|---|---|---|---|---|---|
| C. Stch | 25 | 20 | 454 | 3.2 | 3 min | 85 | 51 |

When the comparative example 34 is compared to results of inventive example 15 it is apparent that the polymer/starch containing inventive sample is 53% (78 compared to 51) superior in cold firmness (CF).

Comparative Example 35

The procedure of inventive example 1 is repeated including times, temperatures, ingredients, etc. except in comparative example 35 no thermoset or thermoplastic binder is used in conjunction with the corn starch. Because no thermoplastic or thermoset binder is used in the process, the resultant batts are very fragile and great care is taken when handling, cutting and pressing the batts.

| Fiber-Binder | Load % | Water % | Wt. | Thick | Ptime | HF | CF |
|---|---|---|---|---|---|---|---|
| C. Stch | 25 | 20 | 490 | 3.2 | 3 min | 87 | 52 |

When the comparative example 35 is compared to results of inventive example 25 it is apparent that the Fiber-Binder/starch containing inventive sample is 33% (69 compared to 52) superior in cold firmness (CF).

Comparative Example 36

The procedure of inventive example 1 is repeated including times, temperatures, ingredients, etc. except in comparative example 36 epoxy based scrap powder paint binder is used. No corn starch is used in these samples. The samples are not moistened prior to molding.

| Fiber-Binder | Load % | Wt. | Thick | Ptime | HF | CF |
|---|---|---|---|---|---|---|
| FL S4000 | 22 | 527 | 3.2 | 2 min | 46 | 77 |

When comparative example 36 is compared with inventive example 15 it is apparent that the inventive example 15 is 89% (87 compared to 46) superior in hot flex (HF).

Comparative Example 37

The procedure of inventive example 1 is repeated including times, temperatures, ingredients, etc. except in comparative example 37 epoxy based scrap powder paint binder is used. No corn starch is used in these samples. The samples are not moistened prior to molding.

| Fiber-Binder | Load % | Wt. | Thick | Ptime | HF | CF |
|---|---|---|---|---|---|---|
| FL S4000 | 22 | 540 | 3.2 | 3 min | 62 | 79 |

When comparative example 37 is compared with inventive example 15 it is apparent that the inventive example 15 is 40% (87 compared to 62) superior in hot flex (HF).

Comparative Example 38

The procedure of inventive example 1 is repeated including times, temperatures, ingredients, etc. except in comparative example 38 epoxy based scrap powder paint binder is used. No corn starch is used in these samples. The samples are not moistened prior to molding.

| Fiber-Binder | Load % | Wt. | Thick | Ptime | HF | CF |
|---|---|---|---|---|---|---|
| FL S4000 | 20 | 499 | 3.2 | 2 min | 20 | 76 |

When comparative example 38 is compared with inventive example 15 it is apparent that the inventive example 15 is 335% (87 compared to 20) superior in hot flex (HF).

Comparative Example 39

The procedure of inventive example 1 is repeated including times, temperatures, ingredients, etc. except in comparative example 39 epoxy based scrap powder paint binder is used. No corn starch is used in these samples. The samples are not moistened prior to molding.

| Fiber-Binder | Load % | Wt. | Thick | Ptime | HF | CF |
|---|---|---|---|---|---|---|
| FL S4000 | 20 | 527 | 3.2 | 3 min | 50 | 77 |

When comparative example 39 is compared with inventive example 15 it is apparent that the inventive example 15 is 74% (87 compared to 50) superior in hot flex (HF).

Comparative Example 40

The procedure of example 1 is repeated including times, temperatures, ingredients, etc. except in example 40 phenolic powdered binder (from Borden chemicals) is used. No corn starch is used in these samples. The samples are not moistened prior to molding.

| Fiber-Binder | Load % | Wt. | Thick | Ptime | HF | CF |
|---|---|---|---|---|---|---|
| Phenolic | 25 | 454 | 3.2 | 1 min | 68 | 79 |

When comparative example 40 is compared with inventive example 15 it is apparent that the inventive example 15 is 28% (87 compared to 68) superior in hot flex (HF).

Comparative Example 41

The procedure of example 1 is repeated including times, temperatures, ingredients, etc. except in example 41 phenolic powdered binder (from Borden chemicals) is used. No corn starch is used in these samples. The samples are not moistened prior to molding.

| Fiber-Binder | Load % | Wt. | Thick | Ptime | HF | CF |
|---|---|---|---|---|---|---|
| Phenolic | 25 | 454 | 3.2 | 2 min | 70 | 79 |

When comparative example 41 is compared with inventive example 15 it is apparent that the inventive example 15 is 24% (87 compared to 70) superior in hot flex (HF).

Comparative Example 42

The procedure of example 1 is repeated including times, temperatures, ingredients, etc. except in example 42 phenolic powdered binder (from Borden chemicals) is used. No corn starch is used in these samples. The samples are not moistened prior to molding.

| Fiber-Binder | Load % | Wt. | Thick | Ptime | HF | CF |
|---|---|---|---|---|---|---|
| Phenolic | 25 | 454 | 3.2 | 3 min | 75 | 79 |

When comparative example 42 is compared with inventive example 15 it is apparent that the inventive example 15 is 16% (87 compared to 75) superior in hot flex (HF).

Comparative Example 43

The procedure of example 1 is repeated including times, temperatures, ingredients, etc. except in example 43 phenolic powdered binder (from Borden chemicals) is used. No corn starch is used in these samples. The samples are not moistened prior to molding.

| Fiber-Binder | Load % | Wt. | Thick | Ptime | HF | CF |
|---|---|---|---|---|---|---|
| Phenolic | 25 | 454 | 3.2 | 3 min | 80 | 68 |

When comparative example 43 is compared with inventive example 15 it is apparent that the inventive example 15 is 9% (87 compared to 80) superior in hot flex (HF).

Inventive Example 44

The procedure of example 1 is repeated including times, temperatures, ingredients, etc. except in example 44 wheat starch is employed as the moisture-sensitive fiber-binder.

| Fiber-Binder | Load % | Water % | Wt. | Thick | Ptime | HF | CF |
|---|---|---|---|---|---|---|---|
| 37FL/63 W. Stch | 42 | 45 | 567 | 3.2 | 5 min | 91 | 84 |

Inventive Example 45

The procedure of example 1 is repeated including times, temperatures, ingredients, etc. except in example 45 wheat starch is employed as the moisture-sensitive fiber-binder.

| Fiber-Binder | Load % | Water % | Wt. | Thick | Ptime | HF | CF |
|---|---|---|---|---|---|---|---|
| 37FL/63 W. Stch | 42 | 46 | 567 | 4.8 | 5 min | 91 | 90 |

Inventive Example 46

The procedure of example 1 is repeated including times, temperatures, ingredients, etc. except in example 46 hydroxypropyl tapioca starch is employed as the moisture-sensitive fiber-binder.

| Fiber-Binder | Load % | Water % | Wt. | Thick | Ptime | HF | CF |
|---|---|---|---|---|---|---|---|
| 37FL/63 HPT. Stch | 41 | 48 | 572 | 4.8 | 5 min | 91 | 90 |

Inventive Example 47

The procedure of example 1 is repeated including times, temperatures, ingredients, etc. except in example 47 tapioca starch is employed as the moisture-sensitive fiber-binder.

| Fiber-Binder | Load % | Water % | Wt. | Thick | Ptime | HF | CF |
|---|---|---|---|---|---|---|---|
| 37FL/63 T. Stch | 40 | 52 | 554 | 4.8 | 5 min | 93 | 91 |

Comparative Example 48

Tensile strength determination of various samples. Two inches by 6 inches sub-samples of the following batts are prepared:

| Fiber-Binder | Load % | Water % | Wt. | Thick | Ptime | HF | CF |
|---|---|---|---|---|---|---|---|
| (x) 60FL/40 C. Stch | 25 | 21.5 | 495 | 3.2 | 5 min | 81 | 70 |
| (y) C. Stch/B-fiber | 25 | 16.5 | 563 | 3.2 | 5 min | 79 | 70 |
| (z) C. Stch | 25 | 20 | 490 | 3.2 | 3 min | 87 | 52 |

Sample x, containing 25% of a 60%, Flex-Lok® S4000 and 40% corn starch fiber-binder mixture, is inventive. Inventive sample y contains 20% polypropylene binder-fiber and 25% corn starch. Comparative sample z contains only 25% corn starch.

Each sample is soaked in 80° C. tap water for 15 minutes. Using a Scott model D.H. tensile strength testing instrument, each sample's tensile strength is measured by applying force to opposite ends of the sample until the sample ruptures.

| Sample | Force required to pull apart | Inventive/Comparative |
|---|---|---|
| (x) | >290 lbs. | Inventive |
| (y) | 98 lbs. | Inventive |
| (z) | 50.5 lbs. | Comparative |

It can be seen by referring to the above data that inventive sample y, wherein the fiber-binder is a low melting fiber of polypropylene, has almost twice the tensile strength (98/50.5) of that of comparative sample z. The results are even more unexpected and surprising when one compares inventive sample x with comparative sample z. In this case, inventive sample x has almost six times (290/50.5) the tensile strength.

Inventive Example 49

The procedure of example 1 is repeated including times, temperatures, ingredients, etc. except in example 49 the inventive Fiber-Binder is a mixture of corn starch and Buckite® 3 epoxy Fiber-Binder (B3).

| Fiber-Binder | Load % | Water % | Wt. | Thick | Ptime | HF | CF |
|---|---|---|---|---|---|---|---|
| 60B3/40 C. Stch | 26 | 19.2 | 468 | 3.2 | 3 min | 87 | 75 |

Inventive Example 50

The procedure of example 1 is repeated including times, temperatures, ingredients, etc. except in example 50 the inventive Fiber-Binder is a mixture of corn starch and Buckite® 3 epoxy Fiber-Binder (B3).

| Fiber-Binder | Load % | Water % | Wt. | Thick | Ptime | HF | CF |
|---|---|---|---|---|---|---|---|
| 60B3/40 C. Stch | 26 | 18.2 | 481 | 3.2 | 3 min | 87 | 75 |

Inventive Example 51

The procedure of example 1 is repeated including times, temperatures, ingredients, etc. except in example 51 the Flex-Lok® S4000 of example 1 is replaced by an equal weight of thermoplastic polyethylene powder (PE) which is mixed with the corn starch. The batts are pre-cured at 204° C. on the apparatus 10.

| Fiber-Binder | Load % | Water % | Wt. | Thick | Ptime | HF | CF |
|---|---|---|---|---|---|---|---|
| 60PE/40 C. Stch | 26 | 18.6 | 513 | 3.2 | 3 min | 83 | 69 |

Inventive Example 52

The procedure of example 1 is repeated including times, temperatures, ingredients, etc. except in example 52 the Flex-Lok® S4000 of example 1 is replaced by an equal weight of thermoplastic polyethylene powder (PE) which is mixed with the corn starch. The batts are pre-cured at 204° C. on the apparatus 10.

| Fiber-Binder | Load % | Water % | Wt. | Thick | Ptime | HF | CF |
|---|---|---|---|---|---|---|---|
| 60PE/40 C. Stch | 26 | 18.6 | 513 | 3.2 | 3 min | 83 | 68 |

Inventive Example 53

The procedure of example 1 is repeated including times, temperatures, ingredients, etc. except in example 53 the Flex-Lok® S4000 of example 1 is replaced by a nearly equal weight of thermoplastic vinyl chloride—vinyl acetate powder (FL033) which is mixed with the corn starch. The batts are pre-cured at 204° C. on the apparatus 10.

| Fiber-Binder | Load % | Water % | Wt. | Thick | Ptime | HF | CF |
|---|---|---|---|---|---|---|---|
| 60FL033/40 C. Stch | 26 | 19.3 | 469 | 3.2 | 3 min | 73 | 74 |

Inventive Example 54

The procedure of example 1 is repeated including times, temperatures, ingredients, etc. except in example 54 the Flex-Lok® S4000 of example 1 is replaced by a nearly equal weight of thermoplastic vinyl chloride—vinyl acetate powder (FL033) which is mixed with the corn starch. The batts are pre-cured at 204° C. on the apparatus 10.

| Fiber-Binder | Load % | Water % | Wt. | Thick | Ptime | HF | CF |
|---|---|---|---|---|---|---|---|
| 60FL033/40 C. Stch | 26 | 17.9 | 499 | 3.2 | 3 min | 75 | 79 |

Comparative Example 55

The procedure of example 1 is repeated including times, temperatures, ingredients, etc. except in example 55 low-melting polypropylene binder-fiber (B-fiber) is mixed with the shoddy fiber to give an approximately 75% shoddy, 25% low-melt fiber blend. No additional thermoset, thermoplastic or starch particulate binder is used in example 55. The batt is pre-cured at 204° C. on the apparatus 10.

| Fiber-Binder | Load % | Wt. | Thick | Ptime | HF | CF |
|---|---|---|---|---|---|---|
| B-Fiber | 25 | 409 | 3.2 | 3 min | −4 | 48 |

When comparative example 55 is compared with inventive example 15 it is apparent that the inventive example 15 is >1000% (87 compared to −4) superior in hot flex (HF) and 62% (78 compared to 48) superior in cold flex (CF).

Comparative Example 56

The procedure of example 1 is repeated including times, temperatures, ingredients, etc. except in example 56 low-melting polypropylene binder-fiber (B-fiber) is mixed with the shoddy fiber to give an approximately 75% shoddy, 25% low-melt fiber blend. No additional thermoset, thermoplastic or starch particulate binder is used in example 56. The batt is pre-cured at 204° C. on the apparatus 10.

| Fiber-Binder | Load % | Wt. | Thick | Ptime | HF | CF |
|---|---|---|---|---|---|---|
| B-Fiber | 25 | 381 | 3.2 | 3 min | −5 | 35 |

When comparative example 56 is compared with inventive example 15 it is apparent that the inventive example 15 is >1000% (87 compared to −5) superior in hot flex (HF) and 122% (78 compared to 35) superior in cold flex (CF).

Comparative Example 57

The procedure of example 1 is repeated including times, temperatures, ingredients, etc. except in example 57 FL-033 thermoplastic powdered binder polymer is used. No additional thermoset, thermoplastic or starch particulate binder is used in example 57. The batt is pre-cured at 204° C. on the apparatus 10.

| Fiber-Binder | Load % | Wt. | Thick | Ptime | HF | CF |
|---|---|---|---|---|---|---|
| FL-033 | 25 | 472 | 3.2 | 3 min | 15 | 74 |

When comparative example 57 is compared with inventive example 15 it is apparent that the inventive example 15 is 480% (87 compared to 15) superior in hot flex (HF) and 17% (78 compared to 74) superior in cold flex (CF).

Comparative Example 58

The procedure of example 1 is repeated including times, temperatures, ingredients, etc. except in example 58 FL-033 thermoplastic powdered binder polymer is used. No additional thermoset, thermoplastic or starch particulate binder is used in example 58. The batt is pre-cured at 204° C. on the apparatus 10.

| Fiber-Binder | Load % | Wt. | Thick | Ptime | HF | CF |
|---|---|---|---|---|---|---|
| FL-033 | 25 | 477 | 3.2 | 3 min | 12 | 75 |

When comparative example 58 is compared with inventive example 15 it is apparent that the inventive example 15 is 625% (87 compared to 12) superior in hot flex (HF) and 4% (78 compared to 75) superior in cold flex (CF).

Comparative Example 59

The procedure of example 1 is repeated including times, temperatures, ingredients, etc. except in example 59 polyethylene thermoplastic powdered binder polymer is used. No additional thermoset, thermoplastic or starch particulate binder is used in example 59. The batt is pre-cured at 204° C. on the apparatus 10.

| Fiber-Binder | Load % | Wt. | Thick | Ptime | HF | CF |
|---|---|---|---|---|---|---|
| Polyethylene | 25 | 527 | 3.2 | 3 min | 1 | 73 |

When comparative example 59 is compared with inventive example 15 it is apparent that the inventive example 15 is >1000% (87 compared to 1) superior in hot flex (HF) and 7% (78 compared to 73) superior in cold flex (CF).

Comparative Example 60

The procedure of example 1 is repeated including times, temperatures, ingredients, etc. except in example 60 polyethylene thermoplastic powdered binder polymer is used. No additional thermoset, thermoplastic or starch particulate binder is used in example 60. The batt is pre-cured at 204° C. on the apparatus 10.

| Fiber-Binder | Load % | Wt. | Thick | Ptime | HF | CF |
|---|---|---|---|---|---|---|
| Polyethylene | 25 | 531 | 3.2 | 3 min | 2 | 72 |

When comparative example 60 is compared with inventive example 15 it is apparent that the inventive example 15 is >1000% (87 compared to 2) superior in hot flex (HF) and 8% (78 compared to 72) superior in cold flex (CF).

Although the invention has been described in considerable detail with respect to certain preferred embodiments thereof, it will be understood that variations are within the skill of the art without departing from the spirit of the invention as described above and as defined in the appended claims.

What is claimed is:

1. A process for producing a shaped article from a bonded, non-woven, fibrous batt of fibers comprising the steps of:
   I. providing a dry, solid, heat-responsive fiber-binder,
   II. providing a moisture-responsive fiber-binder which is a dry, solid, particulate, raw, ungelled starch which swells and becomes sticky upon contact with moisture; and then
   III. contacting fiber-binding amounts of the heat-responsive fiber-binder with the fibers to form a raw batt with the heat-responsive fiber-binder loosely adhering to the fibers of the batt; and
   IV. contacting fiber-binding amounts of the moisture-responsive fiber-binder with the fibers to form a raw batt with the moisture-responsive fiber-binder loosely adhering to the fibers of the batt; and
   V. heating the raw batt to a temperature above the binding temperature of the heat responsive fiber-binder but below the scorching or melting point of the fibers thereby activating the heat-responsive fiber-binder whereupon the heat-responsive fiber-binder engages the intersections of the fibers binding the fibers together at their intersections thereby converting the raw batt into a partially cured batt; and
   VI. contacting the partially cured batt with water, and molding the partially cured batt in a mold thereby causing the moisture-responsive fiber binder to swell, become sticky and further bind the fibers thereby producing a molded shaped article.

2. A process for producing a shaped article from a bonded, non-woven, fibrous batt of fibers comprising the steps of:
   I. providing a dry, solid, heat-responsive fiber-binder,
   II. providing a moisture-responsive fiber-binder which is a dry, solid, particulate, raw, ungelled starch which swells and becomes sticky upon contact with moisture; and then
   III. contacting fiber-binding amounts of the heat-responsive fiber-binder with the fibers to form a raw batt with the heat-responsive fiber-binder loosely adhering to the fibers of the batt; and
   IV. contacting fiber-binding amounts of the moisture-responsive fiber-binder with the fibers to form a raw batt with the moisture-responsive fiber-binder loosely adhering to the fibers of the batt; and
   V. contacting the partially cured batt with water, and molding the partially cured batt in a mold thereby causing the moisture-responsive fiber binder to swell, become sticky and further bind the fibers;
   VI. heating the raw batt to a temperature above the binding temperature of the heat responsive fiber-binder but below the scorching or melting point of the fibers thereby activating the heat-responsive fiber-binder whereupon the heat-responsive fiber-binder engages the intersections of the fibers binding the fibers together at their intersections fibers thereby producing a molded shaped article.

3. A process for producing a tough, dimensionally-stable shaped article from a non-woven, fibrous batt of fibers comprising the steps of:
   I. providing a fiber-binder mixture of:
      A. fiber-binding amounts of a heat-responsive fiber-binder, which is particulate, solid, dry, thermoset polymer free of formaldehyde; and
      B. fiber-binding amounts of a moisture-responsive fiber-binder which is particulate, solid, dry, ungelled starch which swells and becomes sticky upon contact with water;
   II. contacting fibers with fiber-binding amounts of the fiber-binding mixture to form a raw batt with the fiber-binding mixture adhering to the fibers of the batt uniformly throughout the batt, thereby producing a raw batt; and then
   III. heating the raw batt to a temperature above the binding temperature of the heat-responsive fiber-binder thereby activating the heat-responsive fiber-binder whereupon the heat-responsive fiber-binder engages the intersections of the fibers binding the fibers together at their intersections thereby converting the raw batt into a partially cured batt; and then
   IV. placing the partially cured batt in a hot mold;
   V. contacting the batt with water thereby softening the heat-responsive fiber-binder while absorbing moisture into the moisture-responsive fiber-binder causing it to swell, become sticky and engage the intersections of fibers thereby further binding the fibers together;
   VI. continuously removing the water from the batt thereby drying the moisture-responsive fiber-binder causing it to harden and rigidly hold the fibers in place with respect to one another thereby producing a hot fully cured batt; and then
   VII. removing the hot fully-cured batt from contact with the mold; and then
   VIII. cooling the hot fully-cured batt whereupon the heat-responsive fiber-binder cools, hardens and provides toughness to the batt thereby producing a tough, dimensionally-stable shaped article.

4. The process of claim 3 wherein the heat-responsive fiber-binder is a cross linkable polymer.

5. The process of claim 3 wherein the heat-responsive fiber-binder is a cross linkable polymer selected from the group consisting of saturated polyesters, unsaturated polyesters, polyurethanes, epoxies, alkyds and vinyl esters.

6. The process of claim 3 wherein the heat-responsive fiber-binder is scrap material.

7. The process of claim 3 wherein the heat-responsive fiber-binder is scrap polymer that is scrap powder paint.

8. The process of claim 3 wherein the fibers are selected from the group consisting of shoddy, cotton, wool, jute, hemp, flax, sisal, kenaf, polypropylene, polyethylene, polyester, polylactic acid, nylon, acrylic, rayon, mineral wool, glass and mixtures thereof.

9. The process of claim 3 wherein the water is in the form of steam.

10. The process of claim 3 wherein the water is saturated steam.

11. The process of claim 3 wherein the water is super-heated steam.

12. The process of claim 3 wherein the contacting of the partially cured batt with steam is effected by spraying liquid water onto the surface of the batt to produce a moist batt and then contacting the moist batt with a mold at a temperature above about 110° C. thereby forming steam which permeates the entire batt and contacts the moisture-responsive fiber-binder causing it to swell, to become sticky and to engage the intersections of fibers; causing the heat-responsive binder to soften; with the steam leaving the mold thereby subsequently solidifying the starch such that the batt is held rigid for subsequent cooling below the temperature at which the heat-responsive fiber-binder is soft.

13. The process of claim 3 wherein the raw batt is heated in a mold at a temperature of between about 100° C. and about 260° C.

14. The process of claim 3 wherein A:B, the weight ratio of (A) the heat-responsive fiber-binder to (B) the moisture-responsive fiber-binder is from about 1:20 to about 20:1.

15. The process of claim 3 wherein the fibers have a denier of from about 0.1 to about 200.

16. The process of claim 3 wherein the starch is from a member selected from the group consisting of: rice; waxy rice; potatoes; sago; corn (maize); waxy corn; tapioca; maniac; pea; sorghum; rye; oat; barley and wheat.

17. The process of claim 3 wherein the starch is corn starch.

18. The process of claim 3 wherein the heat-responsive fiber-binder has a particle size from about 0.1 to about 500 microns.

19. The process of claim 3 wherein the moisture-responsive fiber-binder has a particle size from about 0.1 to about 200 microns.

20. The process of claim 3 wherein the heat-responsive fiber-binder comprises from about one to about 50 weight percent based on the weight of the cured batt.

21. The process of claim 3 wherein the moisture-responsive fiber-binder comprises from about one to about 50 weight percent based on the weight of the cured batt.

22. The process of claim 3 wherein the heating of the raw batt in Step III is done at a temperature of from about 80° C. to about 250° C. for a time of from about 20 seconds to about 10 minutes thereby converting the raw batt into a partially cured batt.

23. The process of claim 3 wherein the partially cured batt is a high loft batt having a density of between about 0.004 and about 0.4 grans per cubic centimeter.

24. The process of claim 3 where the water:starch weight ratio is from about 1:10 to about 10:1.

25. The process of claim 3 where the water:batt (partially cured) weight ratio is about 1:20 to about 2:1.

26. A process for producing a tough, dimensionally-stable shaped article from a non-woven, fibrous batt of fibers comprising the steps of:

I. providing a fiber-binder mixture of:
   A. fiber-binding amounts of a heat-responsive fiber-binder, which is particulate, solid, dry, thermoplastic polymer free of formaldehyde; and
   B. fiber-binding amounts of a moisture-responsive fiber-binder which is particulate, solid, dry, ungelled starch which swells and becomes sticky upon contact with water;
II. contacting fibers with fiber-binding amounts of the fiber-binding mixture to form a raw batt with the fiber-binding mixture adhering to the fibers of the batt uniformly throughout the batt, thereby producing a raw batt; and then
III. heating the raw batt to a temperature above the binding temperature of the heat-responsive fiber-binder whereupon the heat-responsive fiber-binder engages the intersections of the fibers binding the fibers together at their intersections thereby converting the raw batt into a partially cured batt; and then
IV. placing the partially cured batt in a hot mold;
V. contacting the batt with water and softening the heat-responsive fiber-binder while absorbing moisture into the moisture-responsive fiber-binder causing it to swell, become sticky and engage the intersections of fibers thereby further binding the fibers together;
VI. continuously removing the water from the batt thereby drying the moisture-responsive fiber-binder causing it to harden and rigidly hold the fibers in place with respect to one another thereby producing a hot fully cured batt; and then
VII. removing the hot fully-cured batt from contact with the mold; and then
VIII. cooling the hot fully-cured batt whereupon the heat-responsive fiber-binder cools, hardens and provides toughness to the batt thereby producing a tough, dimensionally-stable shaped article.

27. The process of claim 26 wherein the heat-responsive fiber-binder is a thermoplastic polymer which is an addition polymer.

28. The process of claim 26 wherein the heat-responsive fiber-binder is a thermoplastic polymer which is an addition polymer of the Formula II:

$$H—[CHR^1CHR^2]_n—H \qquad (II)$$

wherein $R^1$ and $R^2$ are independently selected from the group consisting of hydrogen, chloro, lower alkyl, phenyl, benzyl, acryl, methacryl, and wherein "n" is an integer from about 500 to about 40,000.

29. The process of claim 26 wherein the heat-responsive fiber-binder is a member selected from the group consisting of polyethylene, polypropylene, polylactic acid, polyethylene-vinyl ester, polyvinylidene chloride, polystyrene, polyvinyl chloride, polystyrene-butadiene, cellulosics, nylons, polycarbonates and polyester.

30. The process of claim 26 wherein the heat-responsive fiber-binder is scrap material.

31. The process of claim 26 wherein the heat-responsive fiber-binder is scrap polymer that is scrap powder paint.

32. The process of claim 26 wherein the fibers are selected from the group consisting of shoddy, cotton, wool, jute, hemp, flax, sisal, kenaf, polypropylene, polyethylene, polyester, polylactic acid, nylon, acrylic, rayon, mineral wool, glass and mixtures thereof.

33. The process of claim 26 wherein the water is in the form of steam.

34. The process of claim 26 wherein the water is saturated steam.

35. The process of claim 26 wherein the water is super-heated steam.

36. The process of claim 26 wherein the contacting of the partially cured batt with steam is effected by spraying liquid water onto the surface of the batt to produce a moist batt and then contacting the moist batt with a mold at a temperature above about 110° C. thereby forming steam which permeates the entire batt and contacts the moisture-responsive fiber-binder causing it to swell, to become sticky and to engage the intersections of fibers; causing the heat-responsive binder to soften; with the steam leaving the mold thereby subsequently solidifying the starch such that the batt is held rigid for subsequent cooling below the temperature at which the heat-responsive fiber-binder is soft.

37. The process of claim 26 wherein the raw batt is heated in a mold at a temperature of between about 100° C. and about 260° C.

38. The process of claim 26 wherein A:B, the weight ratio of (A) the heat-responsive fiber-binder to (B) the moisture-responsive fiber-binder is from about 1:20 to about 20:1.

39. The process of claim 26 wherein the fibers have a denier of from about 0.1 to 200.

40. The process of claim 26 wherein the starch is from a member selected from the group consisting of: rice; waxy rice; potatoes; sago; corn (maize); waxy corn; tapioca; maniac; pea; sorghum; rye; oat; barley and wheat.

41. The process of claim 26 wherein the starch is corn starch.

42. The process of claim 26 wherein the heat-responsive fiber-binder has a particle size from about 0.1 to about 500 microns.

43. The process of claim 26 wherein the moisture-responsive fiber-binder has a particle size from about 0.1 to about 200 microns.

44. The process of claim 26 wherein the heat-responsive fiber-binder comprises from about one to about 50 weight percent based on the weight of the cured batt.

45. The process of claim 26 wherein the moisture-responsive fiber-binder comprises from about one to about 50 weight percent based on the weight of the cured batt.

46. The process of claim 26 wherein the heating of the raw batt in Step III is done at a temperature of from about 80° C. to about 250° C. for a time of from about 20 seconds to about 10 minutes thereby converting the raw batt into a partially cured batt.

47. The process of claim 26 wherein the partially cured batt is a high loft batt having a density of between about 0.004 and about 0.4 grams per cubic centimeter.

48. The process of claim 26 where the water:starch weight ratio is from about 1:10 to about 10:1.

49. The process of claim 26 where the water:batt (partially cured) weight ratio is about 1:20 to about 2:1.

50. A process for producing a tough, dimensionally-stable shaped article from a non-woven, fibrous batt of fibers comprising the steps of:
  I. providing a mixture of:
    A. a heat-responsive fiber-binder in the form of low melting point fibers which have a melting point below about 150° C., are free of formaldehyde and consist essentially of a dry thermoplastic polymer;
    B. fiber-binding amounts of a moisture-responsive fiber-binder which is particulate, solid, dry, ungelled starch which swells and becomes sticky upon contact with water;
    C. high melting point fibers which have a melting point above about 150° C. and which are free of formaldehyde;
      wherein the melting point of the high melting fibers is at least about 10° C. above the melting point of the low melting point fibers; and then
  II. contacting the mixture of fibers with fiber-binding amounts of the fiber-binding materials to form a raw batt with the fiber-binding materials adhering to the high melting fibers of the batt uniformly throughout the batt, thereby producing a raw batt; and then
  III. heating the raw batt to a temperature above the binding temperature of the heat-responsive fiber-binder, whereupon the heat-responsive low melt fiber softens and sticks to the other fibers binding the fibers together thereby converting the raw batt into a partially cured batt; and then
  IV. placing the partially cured batt in a hot mold;
  V. contacting the batt with water and softening the heat-responsive fiber-binder while absorbing moisture into the moisture-responsive fiber-binder causing it to swell, become sticky and engage the intersections of fibers thereby further binding the fibers together;
  VI. continuously removing the water from the batt thereby drying the moisture-responsive fiber-binder causing it to harden and rigidly hold the fibers in place with respect to one another thereby producing a hot fully cured batt; and then
  VII. removing the hot fully-cured batt from contact with the mold; and then
  VIII. cooling the hot fully-cured batt whereupon the heat-responsive fiber-binder cools, hardens and provides toughness to the batt thereby producing a tough, dimensionally-stable shaped article.

51. The process of claim 50 wherein the heat-responsive fiber-binder is a member selected from the group consisting of polyester, polyethylene, polylactic acid and polypropylene.

52. The process of claim 50 wherein the heat-responsive fiber-binder is scrap material.

53. The process of claim 50 wherein the fibers are selected from the group consisting of shoddy, cotton, wool, jute, hemp, flax, sisal, kenaf, polypropylene, polyethylene, polyester, polylactic acid, nylon, acrylic, rayon, mineral wool, glass and mixtures thereof.

54. The process of claim 50 wherein the water is in the form of steam.

55. The process of claim 50 wherein the water is saturated steam.

56. The process of claim 50 wherein the water is super-heated steam.

57. The process of claim 50 wherein the contacting of the partially cured batt with steam is effected by spraying liquid water onto the surface of the batt to produce a moist batt and then contacting the moist batt with a mold at a temperature above about 110° C. thereby forming steam which permeates the entire batt and contacts the moisture-responsive fiber-binder causing it to swell, to become sticky and to engage the intersections of fibers; causing the heat-responsive binder to soften; with the steam leaving the mold thereby subsequently solidifying the starch such that the batt is held rigid for subsequent cooling below the temperature at which the heat-responsive fiber-binder is soft.

58. The process of claim 50 wherein the raw batt is heated in a mold at a temperature of between about 100° C. and about 260° C.

59. The process of claim 50 wherein A:B, the weight ratio of (A) the heat-responsive fiber-binder to (B) the moisture-responsive fiber-binder is from about 1:20 to about 20:1.

60. The process of claim 50 wherein the fibers have a denier of from about 0.1 to about 200.

61. The process of claim 50 wherein the starch is from a member selected from the group consisting of: rice; waxy rice; potatoes; sago; corn (maize); waxy corn; tapioca; maniac; pea; sorghum; rye; oat; barley and wheat.

62. The process of claim 50 wherein the starch is corn starch.

63. The process of claim 50 wherein the moisture-responsive fiber-binder has a particle size from about 0.1 to about 200 microns.

64. The process of claim 50 wherein the heat-responsive fiber-binder comprises from about one to about 50 weight percent based on the weight of the cured batt.

65. The process of claim 50 wherein the moisture-responsive fiber-binder comprises from about one to about 50 weight percent based on the weight of the cured batt.

66. The process of claim 50 wherein the heating of the raw batt in Step III is done at a temperature of from about 80° C. to about 250° C. for a time of from about 20 seconds to about 10 minutes thereby converting the raw batt into a partially cured batt.

67. The process of claim 50 wherein the partially cured batt is a high loft batt having a density of between about 0.004 and about 0.4 grams per cubic centimeter.

68. The process of claim 50 where the water:starch weight ratio is from about 1:10 to about 10:1.

69. The process of claim 50 where the water:batt (partially cured) weight ratio is about 1:20 to about 2:1.

70. A process for producing a tough, dimensionally-stable shaped article from a non-woven, fibrous batt of fibers comprising the steps of:
  I. providing a mixture of:
    A. fiber-binding amounts of a heat-responsive fiber-binder, which is particulate, solid, dry, free of formaldehyde and which is a mixture of an epoxy polymer and a cross-linking agent for the epoxy polymer; and B. fiber-binding amounts of a moisture-responsive fiber-binder which is particulate, solid, dry, ungelled starch which swells and becomes sticky upon contact with water;

II. contacting fibers with fiber-binding amounts of the fiber-binding mixture to form a raw batt with the fiber-binding mixture adhering to the fibers of the batt uniformly throughout the batt, thereby producing a raw batt; and then III. heating the raw batt to a temperature above the binding temperature of the heat-responsive fiber-binder thereby activating the heat-responsive fiber-binder whereupon the heat-responsive fiber-binder engages the intersections of the fibers binding the fibers together at their intersections thereby converting the raw batt into a partially cured batt; and then IV. placing the partially cured batt in a hot mold;

V. contacting the batt with water and softening the heat-responsive fiber-binder while absorbing moisture into the moisture-responsive fiber-binder causing it to swell, become sticky and engage the intersections of fibers thereby further binding the fibers together;

VI. continuously removing the steam from the batt thereby drying the moisture-responsive fiber-binder causing it to harden and rigidly hold the fibers in place with respect to one another thereby producing a hot fully cured batt; and then VII. removing the hot fully-cured batt from the mold; and then VIII. cooling the hot fully-cured batt whereupon the heat-responsive fiber-binder cools, hardens and provides toughness to the batt thereby producing a tough, dimensionally-stable shaped article.

71. The process of claim 70 wherein the dry, solid, heat-responsive fiber-binder is a particulate, latent-curable, thermosetting, material which is an intimate mixture of:

C. a solid epoxy polymer having:
(a) epoxide groups;
(b) an epoxide equivalent weight of above about 500;
(c) a glass transition temperature above about 40° C.;
(d) a melting point above about 70° C.; admixed with D. a co-reactive hardening quantity of a cross-linking agent which reacts with the epoxide groups of the epoxy polymer.

72. The process of claim 70 wherein the epoxide groups are those of Formula I:

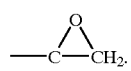

(I)

73. The process of claim 70 wherein the epoxy polymer has an epoxide equivalent weight between about 500 and about 5,000.

74. The process of claim 70 wherein the epoxy polymer is substantially linear with a functionality of about 2.

75. The process of claim 70 wherein the epoxy polymer is branched with a functionality of about 2 to about 5.

76. The process of claim 70 wherein the epoxy polymer has a glass transition temperature above about 40° C.

77. The process of claim 70 wherein the epoxy polymer has a melting point above about 70° C.

78. The process of claim 70 the heat-responsive fiber-binder is in the A-stage.

79. The process of claim 70 the heat-responsive fiber-binder is in the B-stage.

80. The process of claim 70 wherein the cross linking agent is one of the following: a polycarboxylic acid, a polyfunctional amine, a multifunctional acid anhydride, dicyandiamide, a dicyandiamide derivative, a polyol, a multifunctional epoxy.

81. The process of claim 70 wherein the equivalent ratio, C:D, of (C) the epoxy polymer to (D) the cross-linking agent, is from about 1.3:1 to about 1:1.3.

82. The process of claim 70 wherein the fibers are selected from the group consisting of shoddy, cotton, wool, jute, hemp, flax, sisal, kenaf, polypropylene, polyethylene, polyester, polylactic acid, nylon, acrylic, rayon, mineral wool, glass and mixtures thereof.

83. The process of claim 70 wherein the water is in the form of steam.

84. The process of claim 70 wherein the water is saturated steam.

85. The process of claim 70 wherein the water is superheated steam.

86. The process of claim 70 wherein the contacting of the partially cured batt with steam is effected by spraying or otherwise contacting liquid water onto the surface of the batt to produce a moist batt and then contacting the moist batt with a mold at a temperature above about 110° C. thereby forming steam which permeates the entire batt and contacts the moisture-responsive fiber-binder causing it to swell, to become sticky and to engage the intersections of fibers; causing the heat-responsive binder to soften; with the steam leaving the mold thereby subsequently solidifying the starch such that the batt is held rigid for subsequent cooling below the temperature at which the heat-responsive fiber-binder is soft.

87. The process of claim 70 wherein the raw batt is heated in a mold at a temperature of between about 100° C. and about 260° C.

88. The process of claim 70 wherein A:B, the weight ratio of (A) the heat-responsive fiber-binder to (B) the moisture-responsive fiber-binder is from about 1:20 to about 20:1.

89. The process of claim 70 wherein the fibers have a denier of from about 0.1 to about 200.

90. The process of claim 70 wherein the starch is from a member selected from the group consisting of: rice; waxy rice; potatoes; sago; corn (maize); waxy corn; tapioca; maniac; pea; sorghum; rye; oat; barley and wheat.

91. The process of claim 70 wherein the starch is corn starch.

92. The process of claim 70 wherein the heat-responsive fiber-binder has a particle size from about 0.1 to about 500 microns.

93. The process of claim 70 wherein the moisture-responsive fiber-binder has a particle size from about 0.1 to about 200 microns.

94. The process of claim 70 wherein the heat-responsive fiber-binder comprises from about one to about 50 weight percent based on the weight of the cured batt.

95. The process of claim 70 wherein the moisture-responsive fiber-binder comprises from about one to about 50 weight percent based on the weight of the cured batt.

96. The process of claim 70 wherein the heating of the raw batt in Step III is done at a temperature of from about 80° C. to about 250° C. for a time of from about 20 seconds to about 10 minutes thereby converting the raw batt into a partially cured batt.

97. The process of claim 70 wherein the partially cured batt is a high loft batt having a density of between about 0.004 and about 0.4 grams per cubic centimeter.

98. The process of claim 70 where the water:starch weight ratio is from about 1:10 to about 10:1.

99. The process of claim 70 where the water:batt (partially cured) weight ratio is about 1:20 to about 2:1.

100. A process for producing a tough, dimensionally-stable shaped article from a non-woven, fibrous batt of fibers comprising the steps of:
  I. providing a dry free-flowing particulate fiber-binding mixture comprising:
    A. a heat-responsive fiber-binder, which is particulate, solid, dry, and free of formaldehyde; and
      wherein the particle size of the heat-responsive fiber-binder is between about 5 microns and about 50 microns;
    B. a moisture-responsive fiber-binder which is particulate, solid, dry, ungelled corn starch which swells and becomes sticky upon contact with moisture;
      wherein the particle size of the corn starch is between about 1 and 50 microns;
      wherein the A:B ratio is between about 2:10 and about 10:2;
      wherein the heat-responsive fiber-binder comprises form about 10 to about 30 weight percent based on the combined weight of the heat-responsive fiber-binder, the moisture-responsive fiber-binder and the fibers;
      wherein the moisture-responsive fiber-binder comprises from about 10 to about 30 weight percent based on the combined weight of the heat-responsive fiber-binder, the moisture-responsive fiber-binder and the fibers; and then
  II. projecting a stream of air containing the fiber-binding mixture through the batt thereby contacting the fibers of the batt with fiber-binding amounts of the heat-responsive fiber-binder and with fiber-binding amounts of the moisture-responsive fiber-binder with the heat-responsive fiber-binder adhering to the fibers of the batt uniformly in approximately the same weight percent of heat-responsive fiber-binder to fibers throughout the batt, with the moisture-responsive fiber-binder adhering to the fibers of the batt uniformly in approximately the same weight percent of moisture-responsive fiber-binder to fibers throughout the batt, thereby producing a raw batt having a density from about 0.01 grams per cubic centimeter to about 0.1 grams per cubic centimeter; and then
  III. heating the raw batt to a temperature of about 95° C. to 215° C. said temperature being above the binding temperature of the heat-responsive fiber-binder but below the scorching point of the fibers thereby activating the heat-responsive fiber-binder whereupon the heat-responsive fiber-binder engages the intersections of the fibers binding the fibers together at their intersections thereby converting the raw batt into a partially cured batt; and then
  IV. placing the partially cured batt in a hot mold at a temperature of about 150° C. to about 230° C.;
  V. contacting the batt with water in the form of saturated steam thereby softening the heat-responsive fiber-binder while swelling the moisture-responsive fiber-binder causing it to swell, become sticky and engage the intersections of fibers thereby further binding the fibers together;
  VI. while continuously removing the water from the batt thereby drying the moisture-responsive fiber-binder causing it to harden and rigidly hold the fibers in place with respect to one another thereby producing a hot fully cured batt; and then
  VII. removing the hot fully-cured batt from contact with the mold; and then
  VIII. cooling the hot fully-cured batt whereupon the heat-responsive fiber binder cools, hardens and provides toughness to the batt thereby producing a tough, dimensionally-stable shaped article.

101. A process for producing a tough, dimensionally-stable shaped article from a non-woven, fibrous batt of fibers comprising the steps of:
  I. providing a dry free-flowinq particulate fiber-binding mixture comprising:
    A. a heat-responsive fiber-binder, which is particulate, solid, dry, and free of formaldehyde; and
      wherein the particle size of the heat-responsive fiber-binder is between about 5 microns and about 50 microns;
    B. a moisture-responsive fiber-binder which is particulate, solid, dry, ungelled corn starch which swells and becomes sticky upon contact with moisture;
      wherein the particle size of the corn starch is between about 1 and 50 microns;
      wherein the A:B ratio is between about 2:10 and about 10:2;
      wherein the heat-responsive fiber-binder comprises form about 10 to about 30 weight percent based on the combined weight of the heat-responsive fiber-binder, the moisture-responsive fiber-binder and the fibers;
      wherein the moisture-responsive fiber-binder comprises from about 10 to about 30 weight percent based on the combined weight of the heat-responsive fiber-binder, the moisture-responsive fiber-binder and the fibers; and then
  II. contacting the fibers with fiber-binding amounts of the fiber-binding mixture to form a raw batt with the fiber-binding mixture adhering to the fibers of the batt uniformly throughout the batt, thereby producing a raw batt; and then
  III. heating the raw batt to a temperature of about 95° C. to 215° C. said temperature being above the binding temperature of the heat-responsive fiber-binder but below the scorching point of the fibers thereby activating the heat-responsive fiber-binder whereupon the heat-responsive fiber-binder engages the intersections of the fibers binding the fibers together at their intersections thereby converting the raw batt into a partially cured batt; and then
  IV. placing the partially cured batt in a hot mold at a temperature of about 150° C. to about 230° C.;
  V. contacting the batt with water in the form of saturated steam thereby softening the heat-responsive fiber-binder while swelling the moisture-responsive fiber-binder causing it to swell, become sticky and engage the intersections of fibers thereby further binding the fibers together;
  VI. continuously removing the water from the batt thereby drying the moisture-responsive fiber-binder causing it to harden and rigidly hold the fibers in place with respect to one another thereby producing a hot fully cured batt; and then
  VII. removing the hot fully-cured batt from contact with the mold; and then
  VIII. cooling the hot fully-cured batt whereupon the heat-responsive fiber-binder cools, hardens and provides toughness to the batt thereby producing a tough, dimensionally-stable shaped article.

102. A process for producing a tough, dimensionally-stable shaped article from a non-woven, fibrous batt of fibers comprising the steps of:
I. providing a fiber-binder mixture of:
A. fiber-binding amounts of a heat-responsive fiber-binder, which is particulate, solid, dry, thermoset polymer free of formaldehyde; and
B. fiber-binding amounts of a moisture-responsive fiber-binder which is particulate, solid, dry, ungelled starch which swells and becomes sticky upon contact with water;
II. contacting fibers with fiber-binding amounts of the fiber-binding mixture to form a raw batt with the fiber-binding mixture adhering to the fibers of the batt uniformly throughout the batt, thereby producing a raw batt; and then
III. heating the raw batt to a temperature above the binding temperature of the heat-responsive fiber-binder thereby activating the heat-responsive fiber-binder whereupon the heat-responsive fiber-binder engages the intersections of the fibers binding the fibers together at their intersections thereby converting the raw batt into a partially cured batt; and then
IV. placing the partially cured batt in a hot mold;
V. contacting the batt with water thereby softening the heat-responsive fiber-binder while absorbing moisture into the moisture-responsive fiber-binder causing it to swell, become sticky and engage the intersections of fibers thereby further binding the fibers together;
VI. continuously removing the water from the batt thereby drying the moisture-responsive fiber-binder causing it to harden and rigidly hold the fibers in place with respect to one another thereby producing a hot fully cured batt; and then
VII. removing the hot fully-cured batt from contact with the mold; and then
VIII. cooling the hot fully-cured batt whereupon the heat-responsive fiber-binder cools, hardens and provides toughness to the batt thereby producing a tough, dimensionally-stable shaped article; with the provisos that:
a. the raw batt is heated in a mold at a temperature of between about 150° C. and about 230° C.;
b. A:B, the weight ratio of (A) the heat-responsive fiber-binder to (B) the moisture-responsive fiber-binder is from about 2:10 to about 10:2;
c. the fibers have a denier of from about 1 to about 22;
d. the heat-responsive fiber-binder has a particle size from about 1 to about 50 microns;
e. the moisture-responsive fiber-binder has a particle size from about 1 to about 50 microns;
f. the heat-responsive fiber-binder comprises from about 10 to about 30 weight percent based on the weight of the cured batt;
g. the moisture-responsive fiber-binder comprises from about 10 to about 30 weight percent based on the weight of the cured batt;
h. the heating of the raw batt in Step III is done at a temperature of from about 95° C. to about 215° C. for a time of from about 30 seconds to about 3 minutes thereby converting the raw batt into a partially cured batt;
i. the partially cured batt is a high loft batt having a density of between about 0.01 to about 0.1 grams per cubic centimeter; and
j. the water:batt (partially cured) weight ratio is about 1:10 to about 1:1.

103. A process for producing a tough, dimensionally-stable shaped article from a non-woven, fibrous batt of fibers comprising the steps of:
I. providing a fiber-binder mixture of:
A. fiber-binding amounts of a heat-responsive fiber-binder, which is particulate, solid, dry, thermoplastic polymer free of formaldehyde; and
B. fiber-binding amounts of a moisture-responsive fiber-binder which is particulate, solid, dry, ungelled starch which swells and becomes sticky upon contact with water;
II. contacting fibers with fiber-binding amounts of the fiber-binding mixture to form a raw batt with the fiber-binding mixture adhering to the fibers of the batt uniformly throughout the batt, thereby producing a raw batt; and then
III. heating the raw batt to a temperature above the binding temperature of the heat-responsive fiber-binder whereupon the heat-responsive fiber-binder engages the intersections of the fibers binding the fibers together at their intersections thereby converting the raw batt into a partially cured batt; and then
IV. placing the partially cured batt in a hot mold;
V. contacting the batt with water and softening the heat-responsive fiber-hinder while absorbing moisture into the moisture-responsive fiber-binder causing it to swell, become sticky and engage the intersections of fibers thereby further binding the fibers together;
VI. continuously removing the water from the batt thereby drying the moisture-responsive fiber-binder causing it to harden and rigidly hold the fibers in place with respect to one another thereby producing a hot fully cured batt; and then
VII. removing the hot fully-cured batt from contact with the mold; and then
VIII. cooling the hot fully-cured batt whereupon the heat-responsive fiber-binder cools, hardens and provides toughness to the batt thereby producing a tough, dimensionally-stable shaped article; with the provisos that:
a. the raw batt is heated in a mold at a temperature of between about 150° C. and about 230° C.;
b. A:B, the weight ratio of (A) the heat-responsive fiber-binder to (B) the moisture-responsive fiber-binder is from about 2:10 to about 10:2;
c. the fibers have a denier of from about 1 to about 22;
d. the heat-responsive fiber-binder has a particle size from about 1 to about 50 microns;
e. the moisture-responsive fiber-binder has a particle size from about 1 to about 50 microns;
f. the heat-responsive fiber-binder comprises from about 10 to about 30 weight percent based on the weight of the cured batt;
g. the moisture-responsive fiber-binder comprises from about 10 to about 30 weight percent based on the weight of the cured batt;
h. the heating of the raw batt in Step III is done at a temperature of from about 95° C. to about 215° C. for a time of from about 30 seconds to about 3 minutes thereby converting the raw batt into a partially cured batt;
i. the partially cured batt is a high loft batt having a density of between about 0.01 to about 0.1 grams per cubic centimeter; and
j. the water:batt (partially cured) weight ratio is about 1:10 to about 1:1.

104. A process for producing a tough, dimensionally-stable shaped article from a non-woven, fibrous batt of fibers comprising the steps of:

I. providing a mixture of:
   A. fiber-binding amounts of a heat-responsive fiber-binder, which is particulate, solid, dry, free of formaldehyde and which is a mixture of an epoxy polymer and a cross-linking agent for the epoxy polymer; and
   B. fiber-binding amounts of a moisture-responsive fiber-binder which is particulate, solid, dry, ungelled starch which swells and becomes sticky upon contact with water;

II. contacting fibers with fiber-binding amounts of the fiber-binding mixture to form a raw batt with the fiber-binding mixture adhering to the fibers of the batt uniformly throughout the batt, thereby producing a raw batt; and then III. heating the raw batt to a temperature above the binding temperature of the heat-responsive fiber-binder thereby activating the heat-responsive fiber-binder whereupon the heat-responsive fiber-binder engages the intersections of the fibers binding the fibers together at their intersections thereby converting the raw batt into a partially cured batt; and then IV. placing the partially cured batt in a hot mold;

V. contacting the batt with water and softening the heat-responsive fiber-binder while absorbing moisture into the moisture-responsive fiber-binder causing it to swell, become sticky and engage the intersections of fibers thereby further binding the fibers together;

VI. continuously removing the steam from the batt thereby drying the moisture-responsive fiber-binder causing it to harden and rigidly hold the fibers in place with respect to one another thereby producing a hot fully cured batt; and then VII. removing the hot fully-cured batt from the mold; and then VIII. cooling the hot fully-cured batt whereupon the heat-responsive fiber-binder cools, hardens and provides toughness to the batt thereby producing a tough, dimensionally-stable shaped article; with the provisos that:
   a. the raw batt is heated in a mold at a temperature of between about 150° C. and about 230° C.;
   b. A:B, the weight ratio of (A) the heat-responsive fiber-binder to (B) the moisture-responsive fiber-binder is from about 2:10 to about 10:2;
   c. the fibers have a denier of from about 1 to about 22;
   d. the heat-responsive fiber-binder has a particle size from about 1 to about 50 microns;
   e. the moisture-responsive fiber-binder has a particle size from about 1 to about 50 microns;
   f. the heat-responsive fiber-binder comprises from about 10 to about 30 weight percent based on the weight of the cured batt;
   g. the moisture-responsive fiber-binder comprises from about 10 to about 30 weight percent based on the weight of the cured batt;
   h. the heating of the raw batt in Step III is done at a temperature of from about 95° C. to about 215° C. for a time of from about 30 seconds to about 3 minutes thereby converting the raw batt into a partially cured batt;
   i. the partially cured batt is a high loft batt having a density of between about 0.01 to about 0.1 grams per cubic centimeter; and
   j. the water:batt (partially cured) weight ratio is about 1:10 to about 1:1.

* * * * *